(12) United States Patent
Akuzawa

(10) Patent No.: US 9,654,656 B2
(45) Date of Patent: May 16, 2017

(54) INFORMATION PROCESSING SYSTEM, INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Masao Akuzawa, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/841,972

(22) Filed: Sep. 1, 2015

(65) Prior Publication Data
US 2016/0072972 A1    Mar. 10, 2016

(30) Foreign Application Priority Data
Sep. 5, 2014  (JP) .................................. 2014-181598

(51) Int. Cl.
*H04N 1/00* (2006.01)

(52) U.S. Cl.
CPC ....... *H04N 1/00506* (2013.01); *H04N 1/0097* (2013.01); *H04N 1/00411* (2013.01); *H04N 1/00413* (2013.01); *H04N 1/00424* (2013.01); *H04N 1/00474* (2013.01); *H04N 1/00482* (2013.01); *H04N 1/00514* (2013.01); *H04N 1/00517* (2013.01); *H04N 2201/0094* (2013.01)

(58) Field of Classification Search
CPC ........... H04N 1/00506; H04N 1/00411; H04N 1/00424; H04N 1/00474; H04N 1/00482; H04N 1/00514; H04N 1/00413; H04N 1/00517; H04N 1/0097; H04N 2201/0094

USPC ........................................................ 358/1.13
See application file for complete search history.

(56) References Cited

U.S. PATENT DOCUMENTS 6,809,724 B1 * 10/2004 Shiraishi ................. G06F 1/163
                                                       345/157
9,148,533 B2 *  9/2015 Ishiyama ........... H04N 1/00411
(Continued)

FOREIGN PATENT DOCUMENTS

EP         1903767 A1    3/2008
JP       2012-103990 A   5/2012

OTHER PUBLICATIONS

European Search Report issued in corresponding application No. 15180356.6 on Jul. 8, 2016.

*Primary Examiner* — Allen H Nguyen
(74) *Attorney, Agent, or Firm* — Carter, DeLuca, Farrell & Schmidt, LLP

(57) ABSTRACT

There is provided an information processing system including a server and a plurality of information processing apparatuses. The server stores setting information of menu screens of the plurality of information processing apparatuses. Each of the plurality of information processing apparatuses registers the setting information of a menu screen displayed on the information processing apparatus, and stores registered first setting information as a non-synchronization target and registered second setting information as a synchronization target. Each of the plurality of information processing apparatuses transmits, to the server, difference information between the second setting information and the setting information stored in the server, and performs synchronization of the second setting information with the server.

18 Claims, 18 Drawing Sheets

(56) References Cited

U.S. PATENT DOCUMENTS

| | | | |
|---|---|---|---|
| 2010/0179991 A1* | 7/2010 | Lorch | H04M 1/7253 |
| | | | 709/206 |
| 2011/0063651 A1* | 3/2011 | Ehara | H04N 1/00204 |
| | | | 358/1.14 |
| 2011/0299116 A1* | 12/2011 | Hibino | G06F 3/1204 |
| | | | 358/1.15 |
| 2011/0317192 A1* | 12/2011 | Fukuoka | G06F 3/0482 |
| | | | 358/1.13 |
| 2012/0124522 A1 | 5/2012 | Ookuma | |
| 2013/0061149 A1 | 3/2013 | Ikeda et al. | |
| 2014/0300920 A1* | 10/2014 | Hayashi | H04N 1/00413 |
| | | | 358/1.14 |

* cited by examiner

FIG. 10

CUSTOM MENU DATA STORED IN NON-SYNCHRONIZED SETTING DB

SETTING INFORMATION OF CUSTOM MENU

| TAG NAME | | | | DESCRIPTION |
|---|---|---|---|---|
| Icon | | | | ICON ROOT NODE |
| 611 → | APPLICATION ID ~612 | | | APPLICATION ID NODE FOR WHICH ICON HAS BEEN REGISTERED (THERE EXIST NODES, NUMBER OF WHICH IS EQUAL TO NUMBER OF FUNCTIONS) |
| | | ICON ID ~613 | | ICON ID NODE (NON-SYNCHRONIZATION) OF REGISTERED ICON |
| | | | IconM | ICON M KEY |
| | | | IconS | ICON S KEY |
| BackImage | | | | STANDARD BACKGROUND IMAGE NODE |
| 621 → | 0~N ~622 | | | BACKGROUND IMAGE KEY |
| Env | | | | SETTING NODE |
| 631 → | ButtonSize ~632 | | | STANDARD BUTTON SIZE |
| | Background ~633 | | | STANDARD BACKGROUND KEY |
| | ForceLayout ~634 | | | FORCED LAYOUT SETTING |
| ApplicationList | | | | APPLICATION LIST NODE |
| 641 → | APPLICATION 000~* | | | APPLICATION NODE REGISTERED IN CUSTOM MENU |
| | | ApplicationID ~642 | | APPLICATION ID |
| | | ApplicationName | | APPLICATION NAME |

FIG. 11A  CUSTOM MENU DATA STORED IN SYNCHRONIZED SETTING DB

DATA STRUCTURE FOR EACH USER

| TAG NAME | | | DESCRIPTION |
|---|---|---|---|
| Button | | | BUTTON ROOT NODE |
| | 000~* ~652 | | BUTTON NODE |
| | | actID ~653 | ACTION ID KEY |
| | | appID ~654 | APPLICATION ID KEY |
| | | comment ~655 | COMMENT KEY |
| | | name ~656 | BUTTON NAME KEY |
| | | iconID ~657 | ICON ID KEY |
| Index | | | BUTTON INDEX NODE |
| | 000~* | | BUTTON INDEX KEY |
| Env | | | USER SETTING NODE |
| | ButtonSize ~672 | | USER BUTTON SIZE |
| | Background ~673 | | USER BACKGROUND KEY |

651 → Button row
661 → Index row
671 → Env row

FIG. 11B  SETTING INFORMATION OF CUSTOM MENU

| TAG NAME | | | DESCRIPTION |
|---|---|---|---|
| Icon 000~* | | | SYNCHRONIZED ICON ROOT NODE |
| | APPLICATION ID ~682 | | APPLICATION ID NODE FOR WHICH ICON HAS BEEN REGISTERED |
| | ICON ID | | ICON ID NODE (SYNCHRONIZATION) OF REGISTERED ICON |
| | | IconM | ICON M KEY |
| | | IconS | ICON S KEY |
| BackImage | | | SYNCHRONIZED BACKGROUND IMAGE NODE |
| | N~* ~692 | | BACKGROUND IMAGE KEY |

681 → Icon row
691 → BackImage row

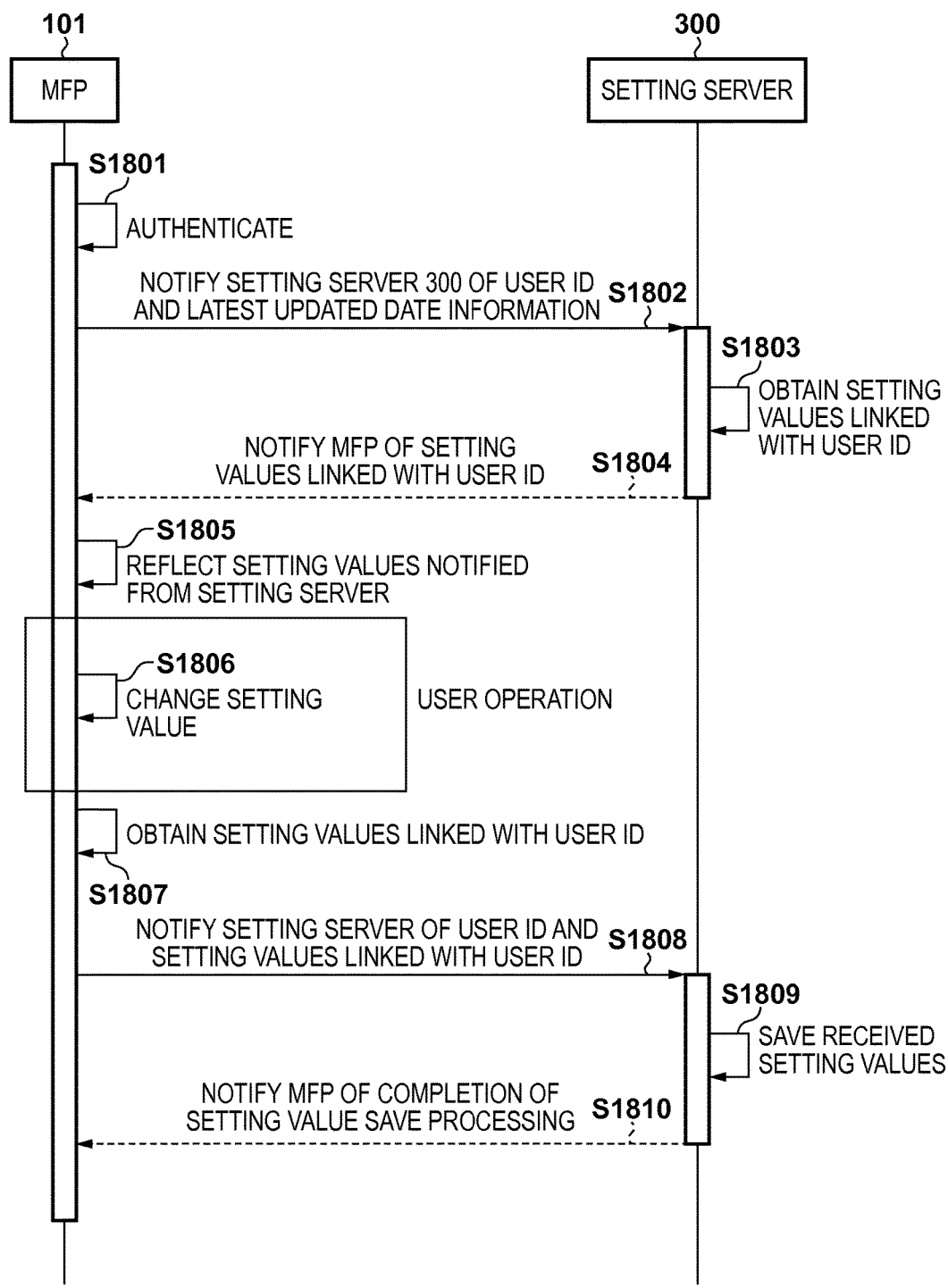

INFORMATION PROCESSING SYSTEM, INFORMATION PROCESSING APPARATUS, METHOD OF CONTROLLING THE SAME, AND STORAGE MEDIUM

BACKGROUND OF THE INVENTION

Field of the Invention

The present invention relates to an information processing system, an information processing apparatus, a method of controlling the same, and a storage medium.

Description of the Related Art

In recent years, image forming apparatuses have various functions, and operations performed by the user for the apparatus are complicated. Since an image forming apparatus is generally shared by a plurality of users in many cases, there is provided a mechanism capable of customizing settings according to each use case. For example, a button storing a setting of "2-in-1 double-sided" indicating a layout setting of "2-in-1" and a finishing setting of "double-sided" is registered in the menu screen of an image forming apparatus. When the user presses the button on the menu screen, the screen can transit to a copy function screen, thereby automatically setting "2-in-1" and "double-sided". This can reduce the user's labor of making print settings (see, for example, Japanese Patent Laid-Open No. 2012-103990).

Furthermore, there is an image forming apparatus which incorporates a browser so as to use Web services (for example, an authentication function, an image processing function, and the like). By registering, as a button, the URL of a Web service referred to from the browser in the menu screen, it is possible to improve the usability of the image forming apparatus in various applications in addition to the functions of the image forming apparatus. Note that if the URL of the Web service is simply registered as a shortcut button from the browser, an icon on the button remains a browser icon. Consequently, if a plurality of browser buttons are registered in the menu, it is difficult to recognize a specific button representing a specific function. To solve this problem, Japanese Patent Laid-Open No. 2012-103990 describes a technique capable of readily discriminating between the functions of respective buttons by displaying icons (Favicon) linked with the URLs of Web services on the buttons.

In the above conventional method, in an environment in which a plurality of image forming apparatuses are installed, a button created by the user using a given image forming apparatus can be used in only the image forming apparatus. Therefore, to instruct a function by displaying the same button on another image forming apparatus, the user needs to register the button again in the other image forming apparatus. Such operation is inconvenient for the user.

SUMMARY OF THE INVENTION

An aspect of the present invention is to eliminate the above-mentioned problems with conventional technology.

A feature of the present invention is to provide a technique of enabling the same operation to be performed by synchronizing setting information set in a menu screen displayed on a given information processing apparatus with that of another information processing apparatus, and displaying the same menu screen on the other information processing apparatus.

According to a first aspect of the present invention, there is provided an information processing system including a server and a plurality of information processing apparatuses, wherein the server comprises: a storage unit configured to store setting information of menu screens of the plurality of information processing apparatuses, and wherein each of the plurality of information processing apparatuses comprises: a registration unit configured to register the setting information of a menu screen displayed on the information processing apparatus, a first storage unit configured to store first setting information as a non-synchronization target, which has been registered by the registration unit, a second storage unit configured to store second setting information as a synchronization target, which has been registered by the registration unit, a transmission unit configured to transmit, to the server, difference information between the second setting information stored by the second storage unit and the setting information stored by the storage unit, and a synchronization control unit configured to perform synchronization of the second setting information between the server and the second storage unit.

According to a second aspect of the present invention, there is provided an information processing apparatus for communicating with a server, comprising: a display unit configured to display a menu screen; a registration unit configured to register setting information of the menu screen; a first storage unit configured to store first setting information as a non-synchronization target, which has been registered by the registration unit; a second storage unit configured to second setting information as a synchronization target, which has been registered by the registration unit; a transmission unit configured to transmit, to the server, difference information between the second setting information stored by the second storage unit and setting information stored in the server; and a synchronization control unit configured to perform synchronization of the second setting information between the server and the second storage unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 depicts a view for explaining the data structure of a non-synchronized setting DB according to the embodiment;

FIGS. 11A and 11B depict views for explaining the data structure of a synchronized setting DB according to the embodiment;

FIG. 18 is a sequence chart for explaining setting value synchronization processing executed between the MFP and a setting server in the information processing system according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
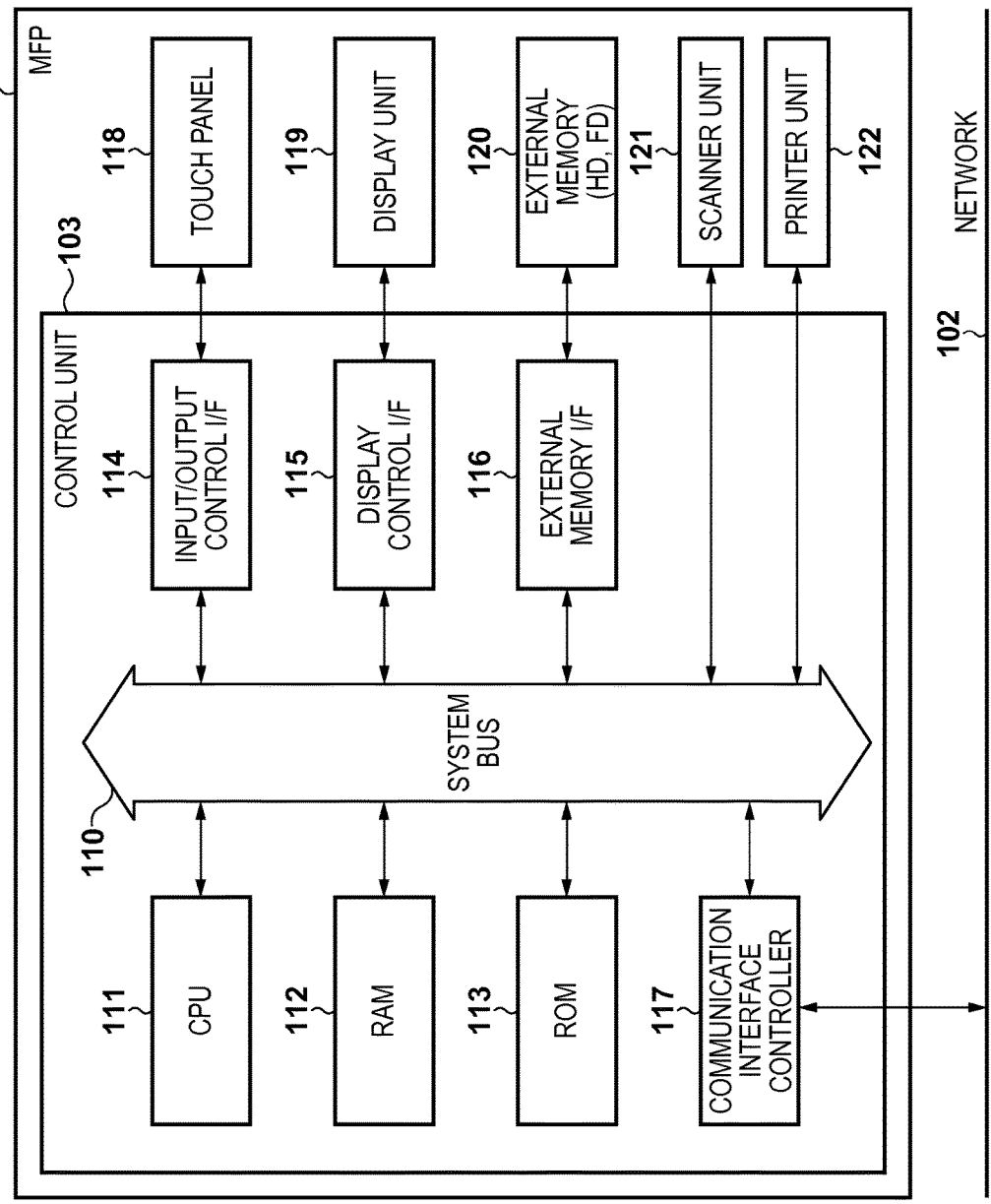
FIG. 1 is a block diagram showing an example of the hardware arrangement of an MFP (Multi-Function Peripheral) according to an embodiment of the present invention.

FIG. 1 is a block diagram showing an example of the hardware arrangement of an MFP (Multi-Function Peripheral) 101 according to an embodiment of the present invention. Note that FIG. 1 shows an example of an image forming apparatus according to the embodiment, and the apparatus may include other components, or include components having the same effects as those in this embodiment.

A control unit 103 includes a CPU 111, a RAM 112, a ROM 113, an input/output control I/F 114, a display control I/F 115, an external memory I/F 116, and a communication interface controller 117, which are interconnected via a system bus 110. A scanner unit 121 and a printer unit 122 are also connected to the system bus 110. The respective units connected to the system bus 110 can exchange data via the system bus 110.

According to a program stored in the ROM 113, for example, the CPU 111 controls the respective units via the system bus 110, and calculates and processes data. The RAM 112 is a volatile memory, and is used as a temporary storage area such as a main memory or work area for the CPU 111. The ROM 113 is a nonvolatile memory, and stores image data, other data, various programs to be used by the CPU 111 to operate, and the like in predetermined areas. The CPU 111 controls the respective units of the MFP 101 by using the RAM 112 as a work memory in accordance with, for example, the program stored in the ROM 113. Note that the program to be used by the CPU 111 to operate may be stored in an external memory 120 instead of the ROM 113, deployed into the RAM 112, and then executed.

The input/output control I/F 114 accepts a user operation, generates a control signal corresponding to the operation, and supplies it to the CPU 111. For example, the input/output control I/F 114 controls an interface with an input device serving as an input device for accepting a user operation, such as a keyboard (not shown), a pointing device, or a touch panel 118. Note that the touch panel 118 is an input device for outputting coordinate information corresponding to a touched position on, for example, an input unit formed into a plane. The CPU 111 controls the respective units of the MFP 101 according to the program based on a control signal generated and supplied by the input/output control I/F 114 in correspondence with a user operation performed for the input device. This can cause the MFP 101 to perform an operation corresponding to the user operation. The display control I/F 115 outputs a display signal for displaying an image on a display unit 119. For example, the CPU 111 supplies the generated display control signal to the display control I/F 115 according to the program. The display control I/F 115 generates a display signal based on the display control signal, and outputs the display signal to the display unit 119 to display an image. For example, based on the display control signal generated by the CPU 111, the display control I/F 115 displays a GUI screen forming a GUI (Graphical User Interface) on the display unit 119. The touch panel 118 may be integrally formed with the display unit 119. For example, the touch panel 118 is formed such that the display on the display unit 119 is not impeded by the light transmittance, and attached to the upper layer of the display surface of the display unit 119. When the input coordinates of a position at which the user performs an operation on the touch panel 118 and display coordinates on the display unit 119 are associated. This can provide a GUI as if the user directly operated the screen displayed on the display unit 119.

For example, an external memory 120 such as an HDD (Hard Disk Drive), flexible disk, CD, DVD, flash memory, or memory card is connectable to the external memory I/F 116. Data is read out from the external memory 120 or written in the external memory 120 under the control of the CPU 111. Depending on the arrangement, the external memory 120 may be used instead of the ROM 113. The communication interface controller 117 communicates with various networks such as a LAN, the Internet, and wired and wireless networks under the control of the CPU 111. Various apparatuses such as a PC, another MFP, a printer, and a server are connected to a network 102 to be communicable with the MFP 101.

The scanner unit 121 reads a document and generates image data of the document under the control of the CPU 111. For example, the CPU 111 causes the scanner unit 121 to perform scan processing in accordance with a user instruction input via the input/output control I/F 114. With this operation, the scanner unit 121 conveys and reads a document placed on a document table or a document placed on an ADF (Automatic Document Feeder), and converts an image signal obtained by reading into digital data, thereby generating image data. The CPU 111 supplies the generated image data to the external memory 120 via the external memory I/F 116, and stores it in the external memory 120. The printer unit 122 prints based on, for example, the image data saved in the external memory 120 under the control of the CPU 111. Furthermore, for example, the CPU 111 causes the printer unit 122 to perform print processing in accordance with a user instruction input via the input/output control I/F 114 or a command input from an external apparatus via the communication interface controller 117. The printer unit 122 receives the image data read out from the RAM 112 or external memory 120 and supplied, and prints on a paper sheet.

Figure 2:
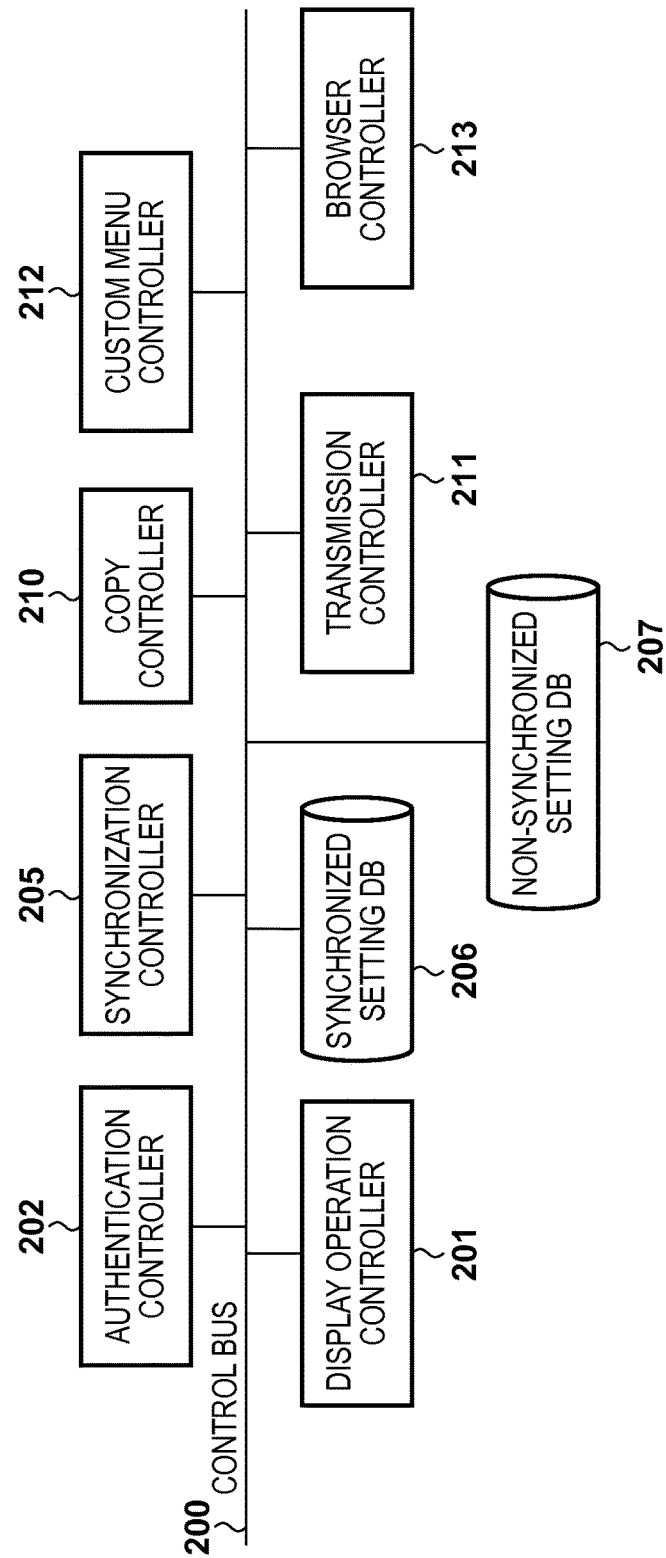
FIG. 2 is a block diagram for explaining the software arrangement of the MFP according to the embodiment.

FIG. 2 is a functional block diagram for explaining the software arrangement of the MFP 101 according to the embodiment. Note that FIG. 2 shows an example for the descriptive purpose in the embodiment, and the MFP 101 may include other components or include components having the same effects as those in the embodiment. Each controller shown in FIG. 2 is achieved when the CPU 111 executes the program stored in the ROM 113.

Respective controllers such as a display operation controller 201, an authentication controller 202, a synchronization controller 205, a copy controller 210, a transmission controller 211, a custom menu controller 212, and a browser controller 213 are connected to a control bus 200. The control bus 200 is a virtual bus for exchanging information between the respective controllers under the control of the CPU 111. The MFP 101 has one or more functions, and includes a controller for each function. FIG. 2 exemplarily shows the copy controller 210, transmission controller 211, custom menu controller 212, and browser controller 213. A controller (not shown) exists for each of functions other than those shown in FIG. 2, as a matter of course. The other functions include a secure print function as a function capable of storing, in the MFP 101, a print job input from a driver and allowing only an authenticated user or a user who knows a password linked with the print job to execute printing. The other functions also include a box function having a function of saving image data in the MFP 101, a help function having a function of displaying a help screen, and a FAX function of receiving a FAX document from a public communication network.

The display operation controller 201 controls the input/output control I/F 114 and display control I/F 115 under the control of the CPU 111. For example, the display operation controller 201 displays data on the display unit 119 via the display control I/F 115 based on an instruction from another controller, and obtains, via the input/output control I/F 114, information input by the user via the touch panel 118. Note that the display operation controller 201 notifies each controller of the obtained information via the control bus 200, as needed. In the following description, assume that information and data are exchanged between the controllers via the control bus 200.

Under the control of the CPU 111, the authentication controller 202 performs authentication processing (to be referred to as login processing hereinafter) for identifying a user, and determines whether the operator of the MFP 101 is an authenticated user of the MFP 101. The authentication controller 202 refers to a database which is provided in the external memory 120 and stores user information. In the login processing, it is determined whether the correspondence between a user name and a password is correct. If the correspondence is correct, the login processing succeeds, and the operator is considered as an authentic user, and can use the functions of the MFP 101 within a given authority range. On the other hand, if the login processing fails, the operator is considered as an unauthentic user, and control processing is performed such that the operator can use the functions of the MFP 101 within a narrower authority range or can use none of the functions. Note that a user authentication method is not limited to that, and another authentication method using a non-contact IC card or the like may be adopted.

The copy controller 210 will be described next. The copy controller 210 controls a function (to be referred to as a copy function hereinafter) of reading a document and printing the image of the document. The copy controller 210 causes the scanner unit 121 to read a document and generate image data, and causes an image processing unit (not shown) to perform image processing for the image data, thereby outputting the processed image data to the printer unit 122 to execute printing. Examples of settings of the copy function are a layout (N-in-1) setting for generating one copy image from N documents, and a double-sided setting for designating whether to read one side or both sides of a document. Furthermore, for example, there is a color mode setting for designating a color to be printed, such as full-color, monochrome, or single-color.

The transmission controller 211 will be explained next. The transmission controller 211 controls a function (to be referred to as a transmission function hereinafter) of transmitting, to an external server, image data obtained by reading a document by the scanner unit 121. The transmission controller 211 causes the scanner unit 121 to read a document and generate image data, and causes the image processing unit (not shown) to perform image processing for the image data, thereby generating a file in a general file format such as JPEG or TIFF. The transmission controller 211 then, for example, sends the generated file to a server, or attaches the generated file to email and sends it.

The browser controller 213 will be described. The browser controller 213 obtains a resource by communicating with a Web server via the network 102. Based on the type of the obtained resource, the CPU 111 executes parsing processing, and outputs a screen, on which text and images are appropriately arranged, to the display unit 119 via the display control I/F 115. As a use example of a browser function, the browser controller 213 issues an HTTP request to a server having a document management function, analyzes a scan request set in a response to the HTTP request, and issues a scan request to the scanner unit 121. After that, image data obtained by the scanner unit 121 is registered as document data in the server.

The custom menu controller 212 will be explained. The custom menu controller 212 controls a function of storing settings of other functions and registering them as buttons on a menu screen which can be customized. After setting a function, the custom menu controller 212 instructs to register the function as a button, thereby registering a shortcut button to the function in a custom menu screen (for example, FIG. 4A). This custom menu screen will be described in detail later.

When the CPU 111 detects a change in a synchronized setting database (DB) 206, the synchronization controller 205 transmits difference information between setting information in a master setting DB 301 (FIG. 3) and that in the synchronized setting DB 206 to a setting server 300 (FIG. 3) via the network 102. Note that the synchronization controller 205 has a mechanism of detecting a changed point for each node (attribute). In this embodiment, such changed point is defined as difference information. A non-synchronized setting DB 207 stores setting information unique to the MFP, which is used by each function of the MFP 101 and is not synchronized with that in the master setting DB 301 of the setting server 300 by the synchronization controller 205.

Both the synchronized setting DB 206 and non-synchronized setting DB 207 are provided in the RAM 112 or external memory 120.

Figure 3:
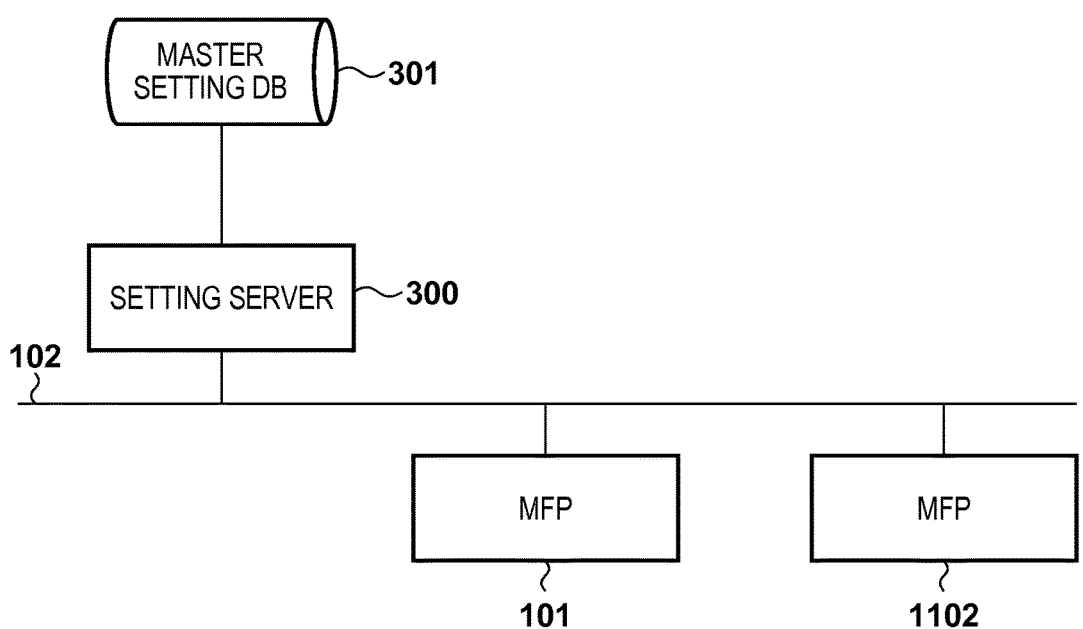
FIG. 3 is a block diagram showing an example of the configuration of an information processing system including the MFP according to the embodiment.

FIG. 3 is a block diagram showing an example of the configuration of an information processing system including the MFP 101 according to this embodiment. Note that FIG. 3 shows an example for explaining the embodiment, and the system may include other components or include components having the same effects as those in this embodiment. The MFP 101 or an MFP 1102 may serve as the setting server 300.

In this information processing system, the setting server 300 and MFPs 101 and 1102 are connected via the network 102. The setting server 300 stores setting information (device settings) of each MFP and individual settings in the master setting DB 301. The hardware arrangement and software arrangement of the MFP 1102 are the same as those of the MFP 101. Upon detecting a change in setting information in the synchronized setting DB 206 of the MFP 101, the synchronization controller 205 of the MFP 101 notifies the setting server 300 of a node including the changed point. The MFP 1102 inquires of the setting server 300 whether the setting information has been changed. If the setting information has been changed, the MFP 1102 obtains the changed setting information from the setting server 300. Consequently, the changed contents of the setting information in the MFP 101 are reflected in the MFP 1102.

Note that when the user changes the setting information in the MFP 101, the synchronization controller 205 performs synchronization processing with the setting server 300. The synchronization processing may be performed at a preset timing, instead of performing it every time the setting information is changed. Alternatively, when the user performs logout processing, the setting information may automatically undergo synchronization processing.

The synchronized setting DB 206 of the MFP 1102 and the master setting DB 301 of the setting server 300 may be synchronized with each other, for example, at the time of login processing or logout processing, at a designated time, after a lapse of a predetermined time, at a designated date/time, or at a timing designated by the user. There may be provided a mode capable of designating a synchronization timing. When, for example, the size of a user button (to be described later) is changed, difference information indicates a user setting node 671 (FIG. 11A). The MFP requests the presence/absence of difference information of the setting server 300 via the network 102. If the difference information exists, the MFP obtains the data as a response, and updates the synchronized setting DB 206. That is, the synchronization controller 205 communicates with the setting server 300 via the communication interface controller 117, thereby controlling to synchronize the setting information stored in the synchronized setting DB 206 with that stored in the master setting DB 301 of the setting server 300.

Note that setting information about the custom menu controller 212 is processed as data included in the synchronized setting DB 206 in this embodiment but the same applies to the setting information of other functions.

Figure 4A:
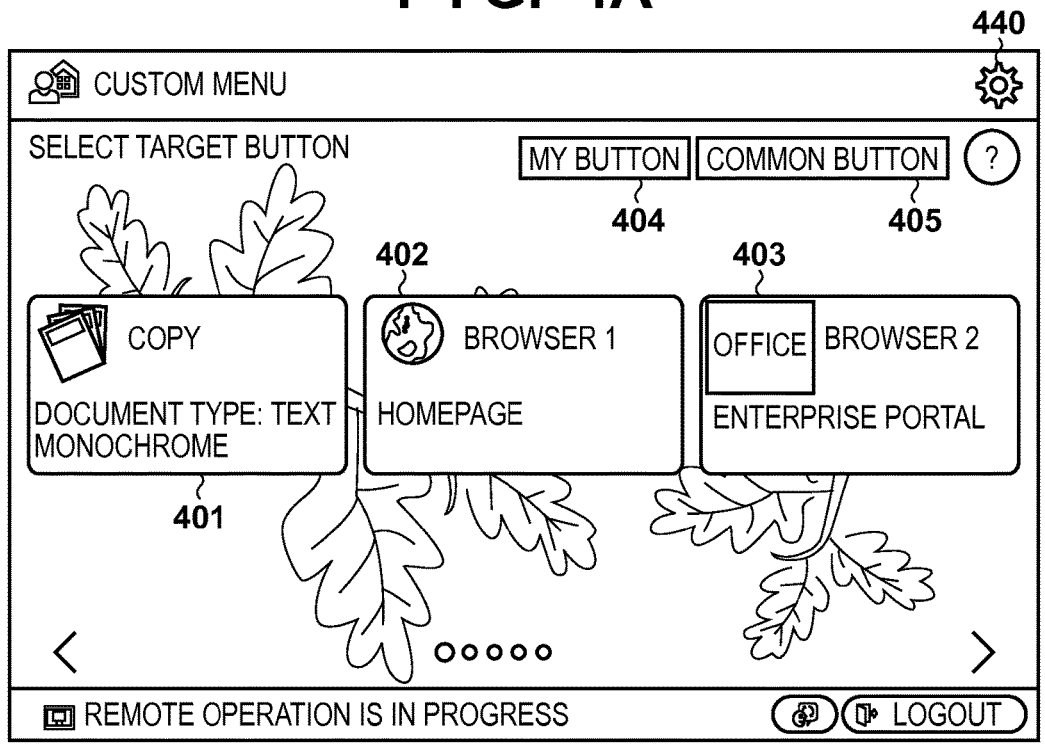
FIGS. 4A and 4B depict views each showing an example of a screen displayed on the MFP according to the embodiment.

FIG. 4A depicts a view showing an example of the custom menu screen provided by the custom menu controller 212 of the MFP 101 according to the embodiment.

This custom menu screen is created by the custom menu controller 212, and has three buttons 401 to 403 on itself. The button 401 is used to transit to the copy controller 210. Each of the buttons 402 and 403 is used to transit to the browser controller 213. Note that a standard icon held by the browser controller 213 is displayed on the button 402 since an icon (Favicon) is not set for a URL as a transition destination. On the other hand, an icon including a character string "OFFICE" is displayed on the button 403 since the icon is set for a URL as a transition destination. My button 404 is used to display dedicated buttons managed for each user linked with the login processing of the authentication controller 202. Common button 405 is used to display buttons commonly usable by users who have not complete login processing by the authentication controller 202, that is, unauthenticated users, or all users. Note that as long as the authentication controller 202 has a mechanism capable of managing a plurality of users for each group, a group button for displaying buttons usable by each group may be added.

Upon detecting pressing of one of the buttons 401 to 403 via the input/output control I/F 114, the custom menu controller 212 issues a calling request to a corresponding controller together with the setting information obtained from the synchronized setting DB 206. For example, upon detecting pressing of the button 401, the custom menu controller 212 issues a copy function calling request to the copy controller 210. This causes the copy controller 210 to display a confirmation dialogue shown in FIG. 4B on the display unit 119.

Figure 4B:
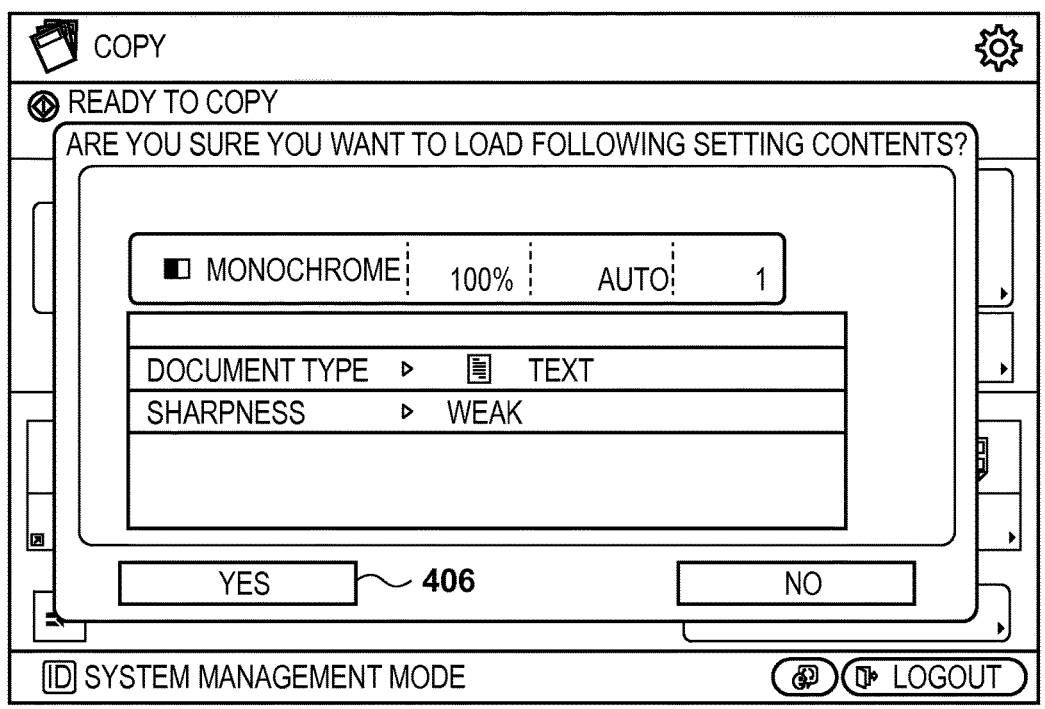

FIG. 4B depicts a view showing a display example of the confirmation dialogue when the button 401 is instructed on the screen shown in FIG. 4A.

Figure 9:
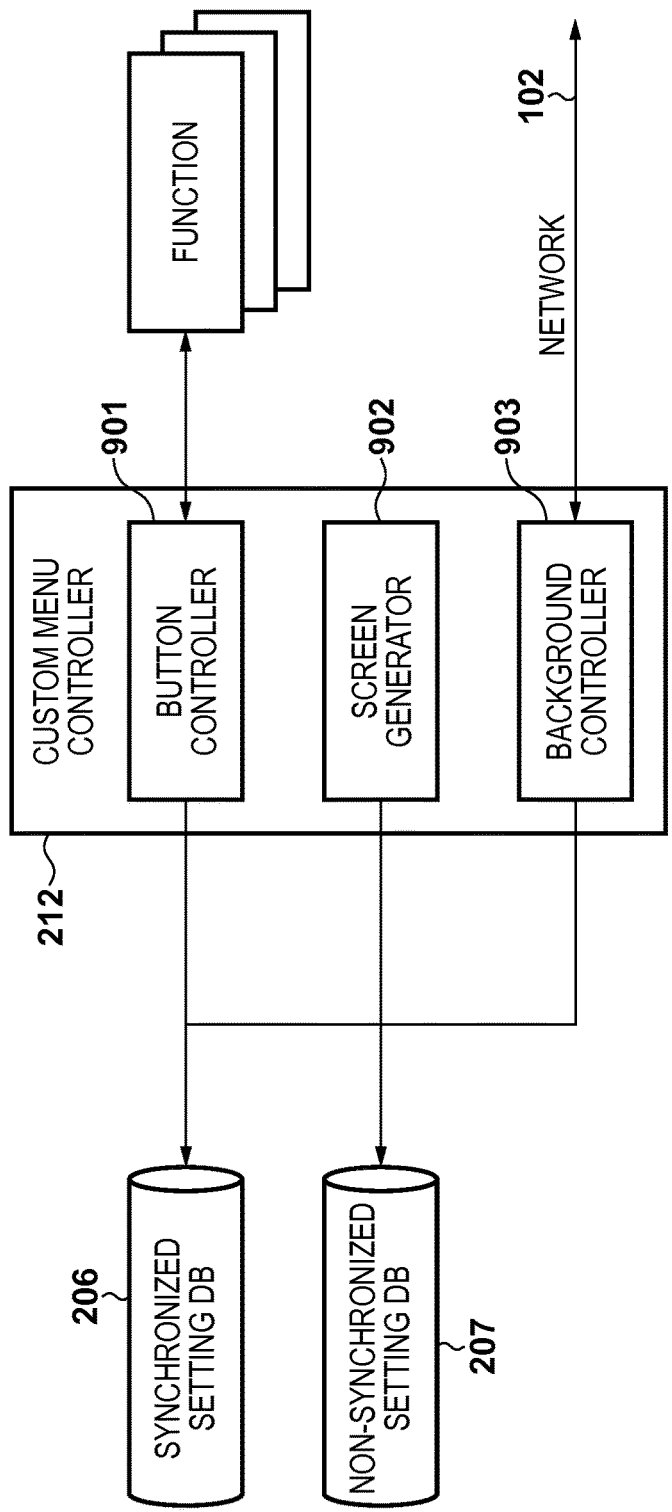
FIG. 9 is a block diagram for explaining the software arrangement of the custom menu controller of the MFP according to the embodiment.

In this example, the setting information such as monochrome and a document type is transferred to the copy controller 210 via a button controller 901 (FIG. 9). At this time, for example, the setting information is transferred from the button controller 901 to the copy controller 210 in the XML format as follows.

```
<?xml version="1.0" encoding="UTF-8"?>
<action ID>001</action ID>
<setting information>
    <color selection>monochrome</color selection>
    <density>0</density>
    <scaling>non-scaled</scaling>
    <paper selection>auto</paper selection>
    <document type>text</document type>
</setting information>
```

Note that the action ID is the identification information of the setting information of a function linked with a button node 652 (FIG. 11A). The structure of data handled by the custom menu controller 212 will be described later with reference to FIGS. 10, 11A, and 11B.

Figure 5A:
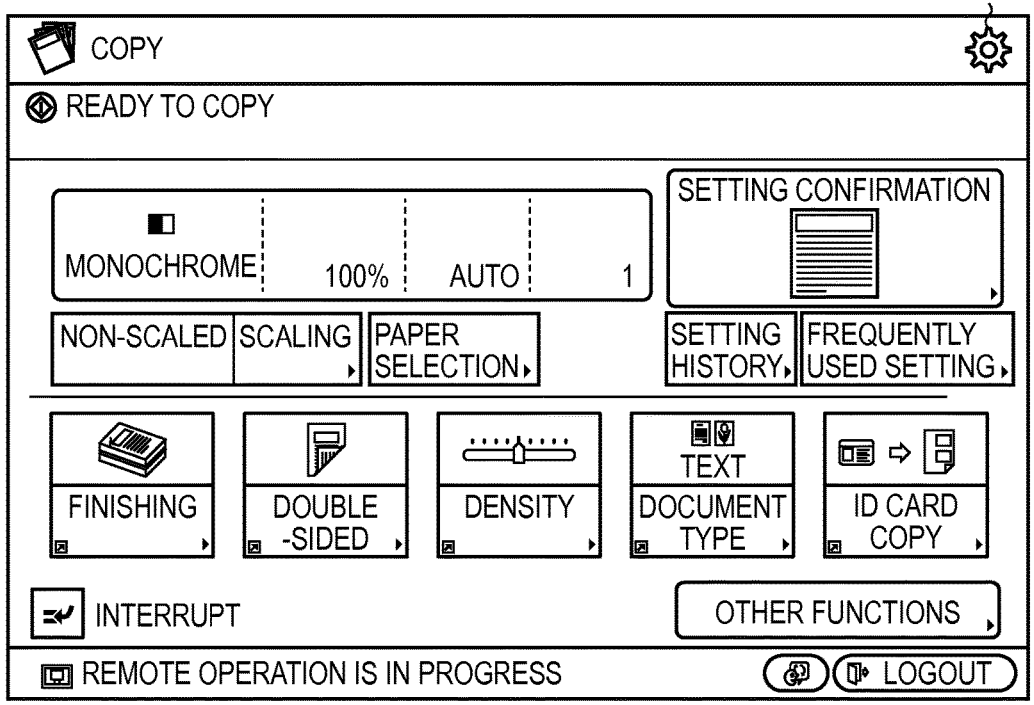
FIGS. 5A and 5B depict views each showing an example of a screen displayed on the MFP according to the embodiment.

Upon detecting pressing of a "YES" button 406 shown in FIG. 4B, the copy controller 210 displays a copy screen (FIG. 5A), in which the above-described setting information has been reflected, on the display unit 119 via the display control I/F 115.

Figure 5B:
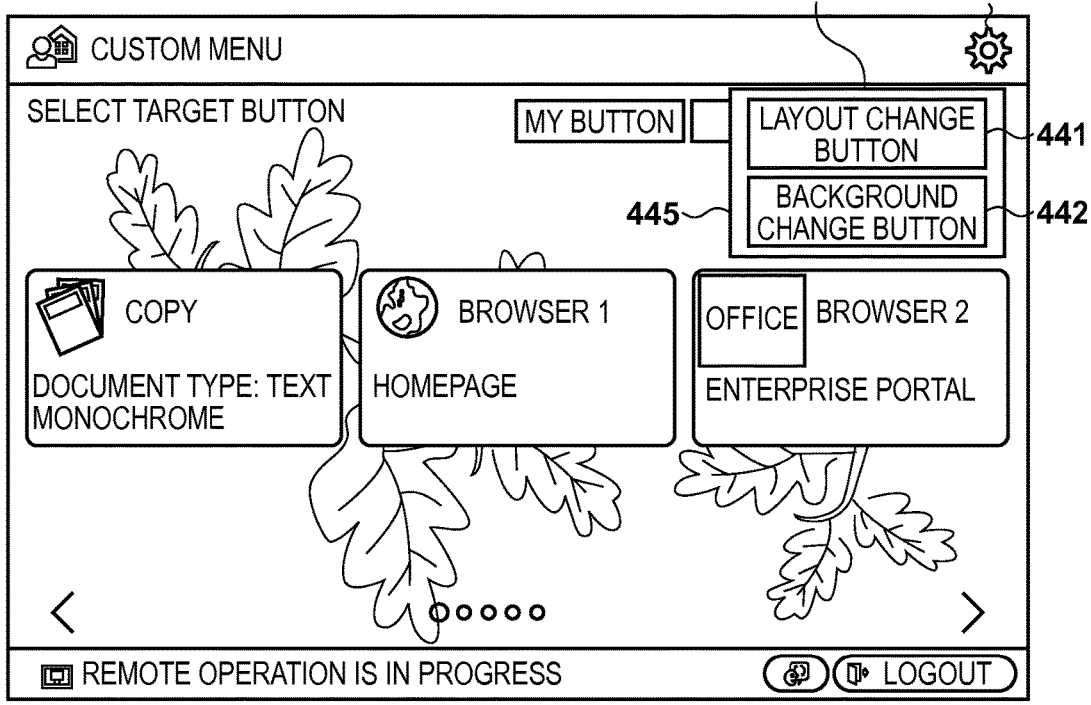
Figure 6A:
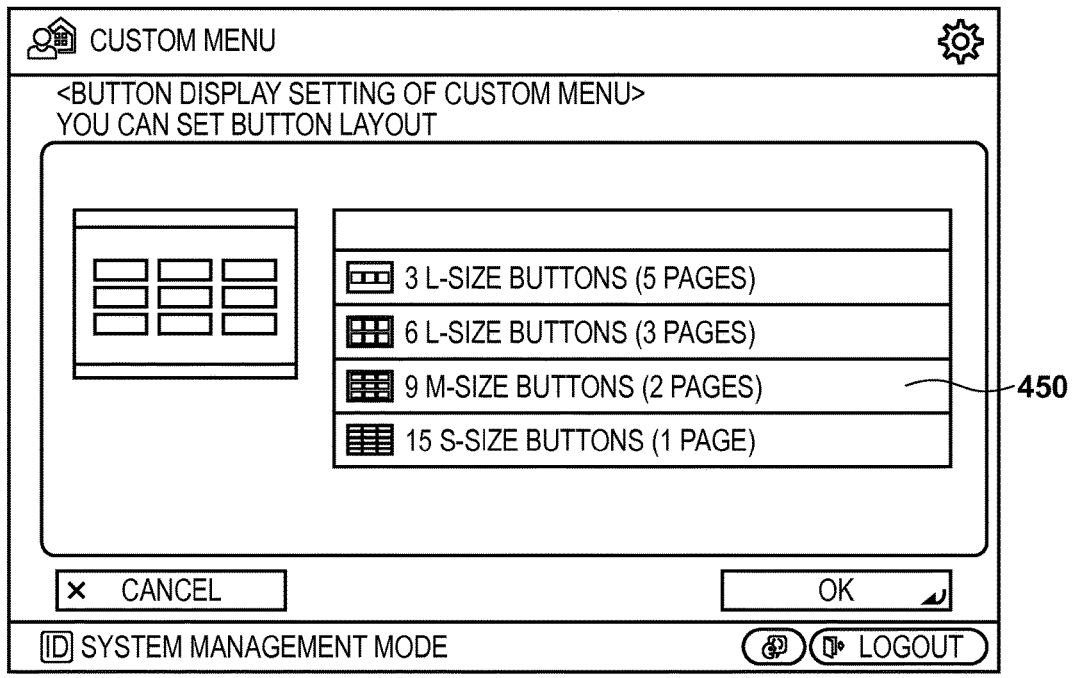
FIGS. 6A and 6B depict views each showing an example of a screen displayed on the MFP according to the embodiment.

Upon pressing a setting button 440 on the screen shown in FIG. 4A, the custom menu controller 212 detects pressing of the setting button 440, and displays a custom menu screen shown in FIG. 5B. Referring to FIG. 5B, a custom menu setting dialogue 445 including a layout change button 441 and a background change button 442 pops up. Upon detecting pressing of the layout change button 441 on the screen by the user, the custom menu controller 212 displays a layout change dialogue shown in FIG. 6A.

Figure 6B:
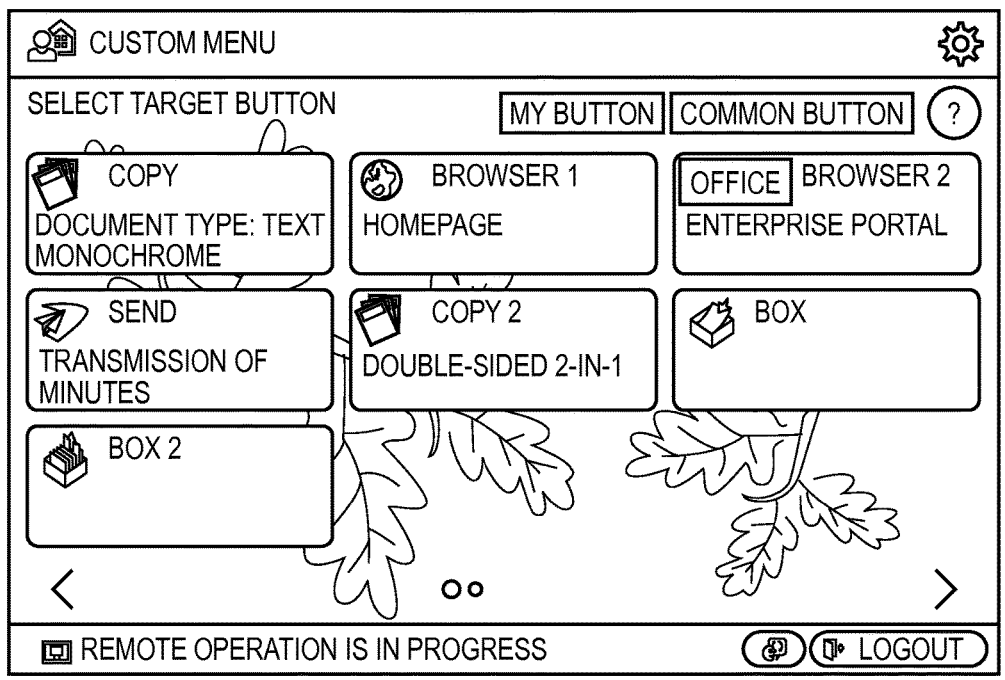

The three buttons 401 to 403 are displayed on the custom menu screen shown in FIG. 4A. This corresponds to "3 L-size buttons (5 pages)" shown in FIG. 6A. When, for example, the user selects a layout of "9 M-size buttons (2 pages)" 450 on the screen shown in FIG. 6A, the custom menu controller 212 detects it. The custom menu controller 212 then displays a custom menu screen (FIG. 6B) on which the layout of the buttons has been changed. On the custom menu screen shown in FIG. 6B, the maximum number of buttons on the menu screen has been changed from three to nine. That is, the size of each button to be displayed is changed from L size to M size to reduce the size of the icon, thereby allowing a larger number of buttons to be displayed.

Figure 7A:
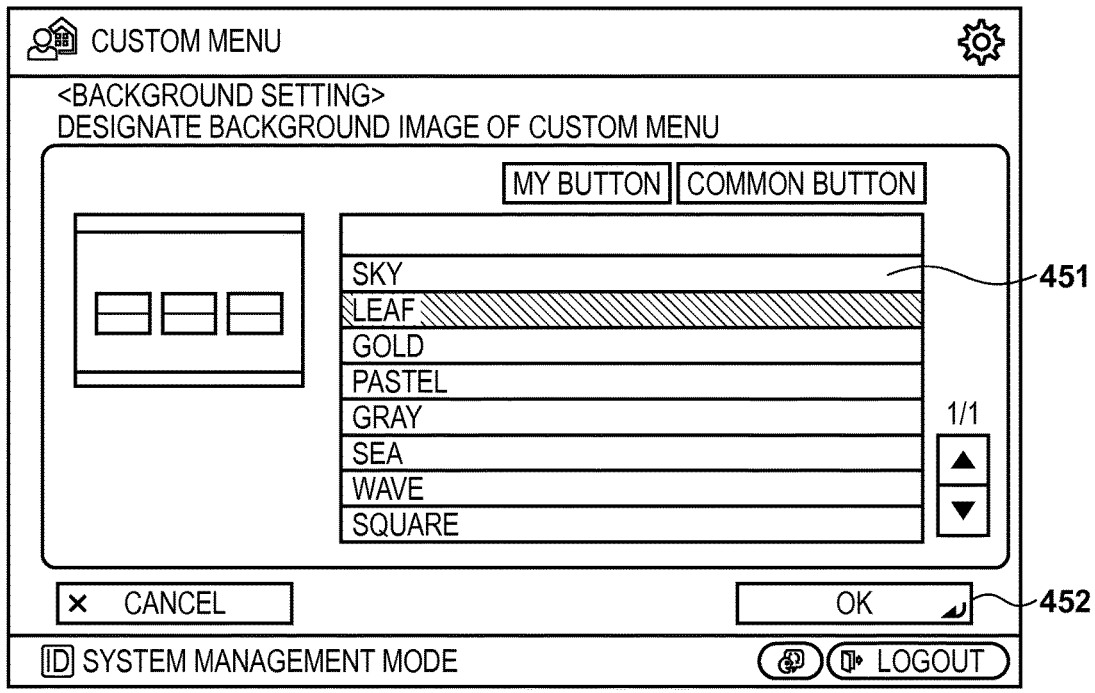
FIGS. 7A and 7B depict views each showing an example of a screen displayed on the MFP according to the embodiment.
Figure 7B:
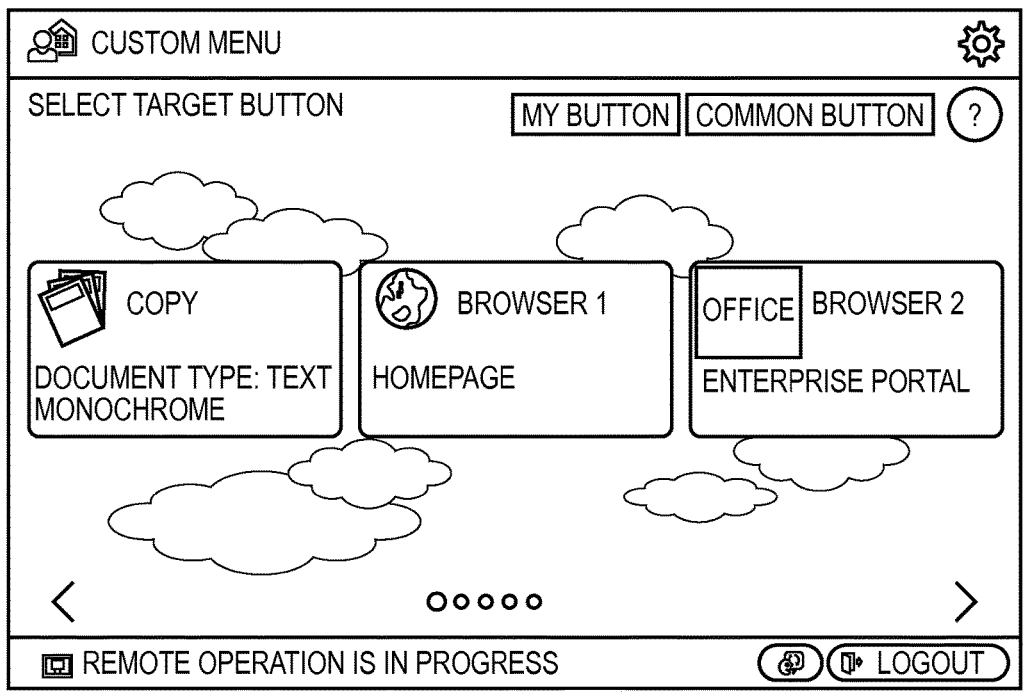

On the other hand, upon detecting pressing of the background change button 442 on the screen shown in FIG. 5B, the custom menu controller 212 displays a background change dialogue shown in FIG. 7A on the display unit 119 via the display control I/F 115. The custom menu controller 212 displays an image of "leaf" on the background of the custom menu screen shown in FIG. 4A. In this state, when the user selects "sky" 451 in the background change dialogue shown in FIG. 7A, and presses an OK button 452, the custom menu controller 212 detects it. This displays, on the display unit 119, the custom menu screen whose background image is "sky", as shown in FIG. 7B.

Figure 8:
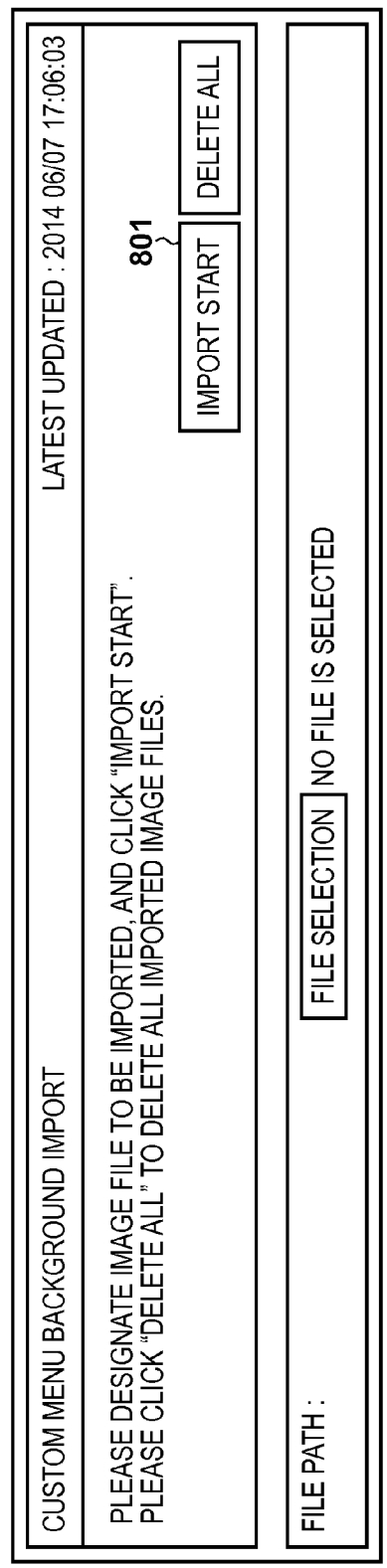
FIG. 8 depicts a view showing an example of a screen for importing a background image of a custom menu screen in the MFP according to the embodiment.

FIG. 8 depicts a view showing an example of a screen for importing the background image of the custom menu screen in the MFP 101 according to the embodiment.

FIG. 8 shows an example of an import screen which is displayed by a Web browser (not shown) incorporated in a PC or the like when accessing a URL for importing the background image of the MFP 101 from the Web browser. By selecting a file of a desired background image and pressing an import start button 801 on this screen, the imported image file can be registered as a background image in the custom menu controller 212. This registration processing will be described later.

FIG. 9 is a block diagram for explaining the software arrangement of the custom menu controller 212 of the MFP 101 according to the embodiment.

The custom menu controller 212 includes the button controller 901, a screen generator 902, and a background controller 903. In response to a button registration request from a function, the button controller 901 sets information about a button in the synchronized setting DB 206 and non-synchronized setting DB 207. Upon pressing a button on the menu screen, setting information about the button is loaded from the synchronized setting DB 206 and non-synchronized setting DB 207, thereby calling a function matching an application ID 612 (FIG. 10). At this time, the function is notified of setting information linked with an action ID key 653 (FIG. 11A). This enables the function to reflect the setting information desired by the user.

The screen generator 902 generates a screen to be displayed on the display unit 119 by the custom menu controller 212. For example, buttons are arranged on a selected background image to generate the custom menu screen shown in FIG. 4A or 6B according to a layout. Furthermore, the screen generator 902 generates an auxiliary screen such as the custom menu setting dialogue 445 shown in FIG. 5B including the layout change button 441 and background change button 442. The generation processing of the custom menu screen will be described later.

Upon accepting a background image registration request via the network 102, the background controller 903 registers a background image in the synchronized setting DB 206. The background image registration processing will be described later. Note that the background image registration request need not be accepted via the network 102, and the custom menu controller 212 may be notified of a background image saved in the external memory 120 via the control bus 200.

FIG. 10 depicts a view for explaining the data structure of the non-synchronized setting DB 207 according to the embodiment. FIGS. 11A and 11B depict views for explaining the data structure of the synchronized setting DB 206 according to the embodiment wherein FIG. 11A shows a data structure for each user and FIG. 11B shows the setting information of the custom menu.

Icons, background images, settings, and data about an application list which are managed by the custom menu controller 212 are registered in the non-synchronized setting DB 207. An application list node 641 indicates a list in which pieces of identification information of functions (applications) using a custom menu function. Each function registers an application ID 642 and application name as identification information of the function when requesting registration of the custom menu controller 212 in order to use the custom menu function. A sequence of requesting the custom menu controller 212 to register each function will be described later.

An icon root node 611 manages an icon for which the icon of a function (application) is requested to be registered at the time of activation of the application among the functions using the custom menu function. Therefore, there exist icon root nodes 611, the number of which is equal to that of application IDs 612 of the functions whose icons have been registered. A non-synchronized icon ID node 613 indicates the identification information of the registered icon, which includes identification information about an M-size icon (IconM) (an icon having a middle size) and that about an S-size icon (IconS) (an icon having a size smaller than M size).

A standard background image node 621 stores a key to a standard background image held by the custom menu controller 212. The key may be interpreted as the background image itself or a file path, and may be in any format as long as the actual background image can be referred to with the key. Note that in FIG. 10, a background image key 622 indicates that the number of held standard background images falls within the range from 0 to N.

A setting node 631 includes a standard button size 632, a standard background key 633, and a forced layout setting 634. When the user is unauthenticated, or an abnormal button size or background key is designated, the setting node 631 is referred to. Note that each of the standard button size 632 and a user button size 672 (to be described later) (FIG. 11A) is paired with the layout of the custom menu screen, and is set to a value indicating M size for the three-button layout or S size for the nine-button layout. For example, a value of 3M or 9S is set. The standard background key 633 or a user background key 673 (to be described later) (FIG. 11A) indicates the background image key 622 or a background image key 692 (FIG. 11B), thereby determining the background image of the custom menu screen. The forced layout setting 634 is used to forcibly fix the layout setting of the custom menu screen in the MFP 101. For example, if the nine-button layout is set in the forced layout setting 634, it is impossible to change the layout to the three-button layout or the like.

The synchronized setting DB 206 will be described next.

The synchronized setting DB 206 stores data for each user for the custom menu controller 212, as shown in FIG. 11A, and this data can be referred to only when the authentication controller 202 completes authentication processing.

The number of button root nodes 651 is equal to that of buttons of the button node 652. The button node 652 stores information about a button to be displayed on the menu screen, and includes the action ID key 653, an application ID key 654, a comment key 655, a button name key 656, and an icon ID key 657. The action ID key 653 is identification information for referring to the setting information of a function linked with the button node 652 from the synchronized setting DB 206, and may be in a form of a file path. The application ID key 654 is the identification information of a function having the actual function of the button, and is unique to the function. The comment key 655 and button name key 656 are pieces of identification information linked with a comment to be displayed on the button on the custom menu screen and character information of a name, respectively, but may store character strings themselves instead of the pieces of identification information. The icon ID key 657 matches the non-synchronized icon ID node 613 or a synchronized icon ID node 682 (FIG. 11B), and is identification information for determining the icon of the button.

A button index node 661 includes button index keys, the number of which is equal to that of buttons, and each button index key points to the button node 652. If, for example, the button index key is "0" to point to the sixth button node 652, the sixth button node 652 is displayed as the copy button 401 on the custom menu screen shown in FIG. 4A.

The user setting node 671 includes the user button size 672 and the user background key 673. The user button size 672 manages a button size such as S size or M size for each user. The user background key 673 manages a background image key for each user so as to freely select a background image.

As shown in FIG. 11B, the synchronized setting DB 206 stores the setting information of the custom menu similar to that in the non-synchronized setting DB 207. This setting information of the custom menu will be explained below.

A synchronized icon root node 681 is an area for storing an icon other than the icons each registered at the time of activation of the application in response to a button registration request from the function. For example, if the browser controller 213 issues a button registration request to the custom menu controller 212, the icon linked with the URL is displayed on the button 403, as indicated by the button 403 shown in FIG. 4A. Therefore, the custom menu controller 212 registers the synchronized icon ID node 682 in the synchronized icon root node 681.

A synchronized background image node 691 is a node for storing a background image other than the standard background images held by the custom menu controller 212 along with the registration request of a background image, and includes the background image key 692 indicating reference information to the background image.

Note that a pair of the non-synchronized icon ID node 613 (FIG. 10) and synchronized icon ID node 682 and a pair of the background image key 622 and synchronized background image node 691 are uniquely determined in the synchronized setting DB 206 and non-synchronized setting DB 207, and there are no keys overlapping each other between the DBs. The icon of the button and the background image can be uniquely obtained regardless of the DBs.

In this embodiment, in response to an icon registration request from the browser, the MFP 101 displays the button 403 including the icon of an enterprise portal instead of the button 402 of a normal homepage, as indicated by the button 403 shown in FIG. 4A. Then, the MFP 1102 is also allowed to display the menu screen including the button 403. For example, when displaying the menu screen shown in FIG. 4A, the application ID of the synchronized icon root node 681 indicates "the browser" and the synchronized icon ID node 682 specifies "the icon of the office portal" in the custom menu setting information shown in FIG. 11B.

Figure 12:
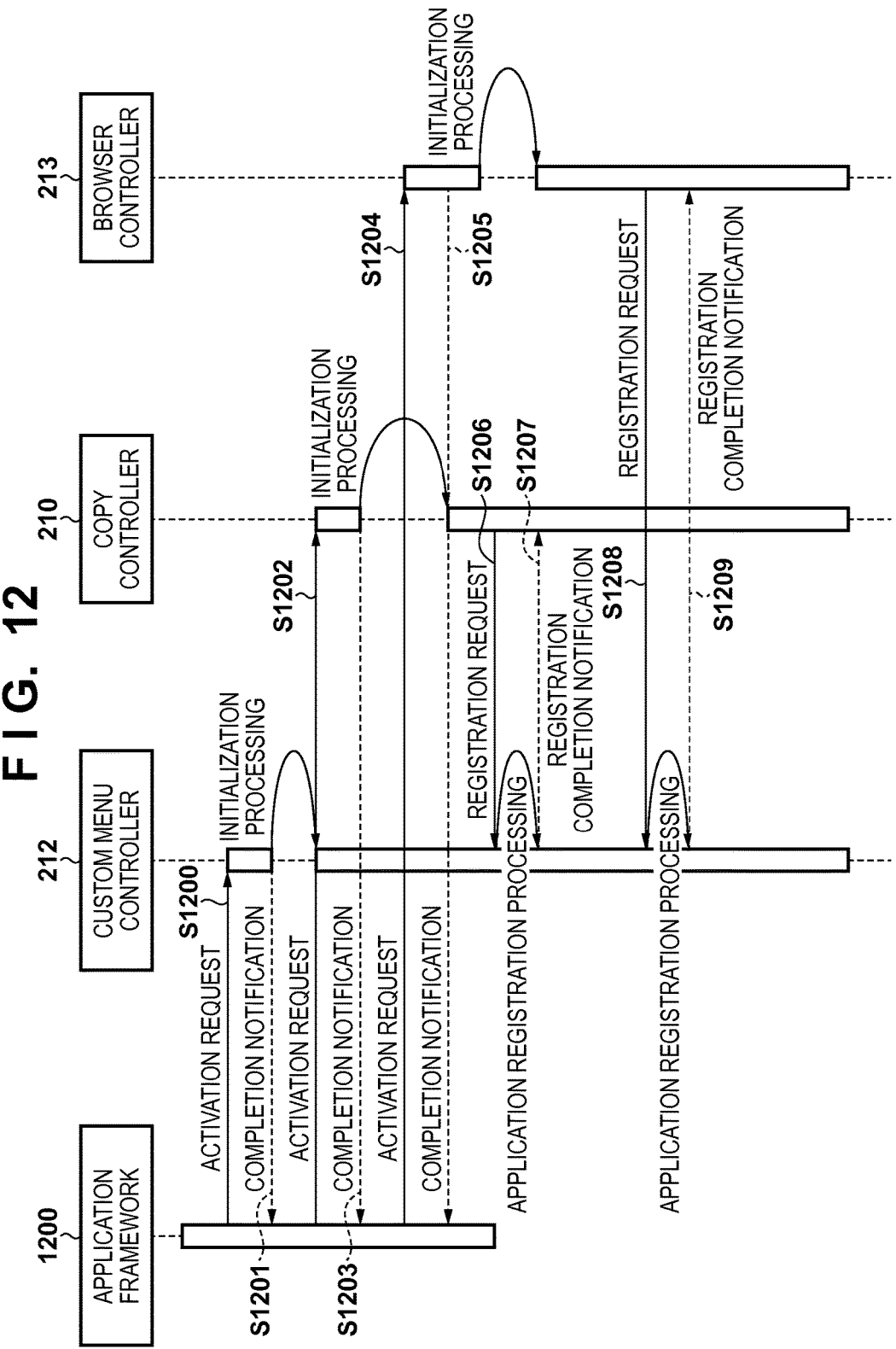
FIG. 12 is a sequence chart showing a function registration procedure at the time of activation of the MFP according to the embodiment.

FIG. 12 is a sequence chart showing a function registration procedure at the time of activation of the MFP 101 according to the embodiment. This procedure is executed under the control of the CPU 111 of the MFP 101. Note that an application framework 1200 shown in FIG. 12 manages the life cycle (start, stop, restart, end, and the like) of a function (application), and operates first at the time of activation of the MFP 101. This application framework 1200 is a kind of boot module of the MFP 101 existing in the ROM 113 or external memory 120.

In this example, the custom menu screen shown in FIG. 4A will be exemplified. In step S1200, the application framework 1200 issues an activation request to the custom menu controller 212. In response to this, the custom menu controller 212 obtains the setting information from the synchronized setting DB 206 or non-synchronized setting DB 207, and activates, as initialization processing, a thread for performing update processing, as needed. In step S1201, upon completion of the activation of the thread, the custom menu controller 212 notifies the application framework 1200 of a completion notification. In steps S1202 and S1204, the application framework 1200 successively issues activation requests to the copy controller 210 and browser controller 213. In steps S1203 and S1205, upon receiving completion notifications from the respective functions, the application framework 1200 terminates the process. Note that in the initialization processing of each of the copy controller 210 and browser controller 213, a thread for performing initialization processing for each function is generated, similarly to the initialization processing of the custom menu controller 212. Upon completion of the generation of the thread, the application framework 1200 is notified of a completion notification.

During the initialization processing, the copy controller 210 issues a function registration request to the custom menu controller 212 in step S1206. In response to this, the custom menu controller 212 executes function registration processing, and then responds to the copy controller 210 with a registration completion notification in step S1207. Note that the application ID, application name, and icon are transferred to the custom menu controller 212 by the registration request in step S1206. Similarly, during the initialization processing, the browser controller 213 issues a function registration request to the custom menu controller 212 in step S1208, executes registration processing, and sends a registration completion notification in step S1209.

Figure 13:
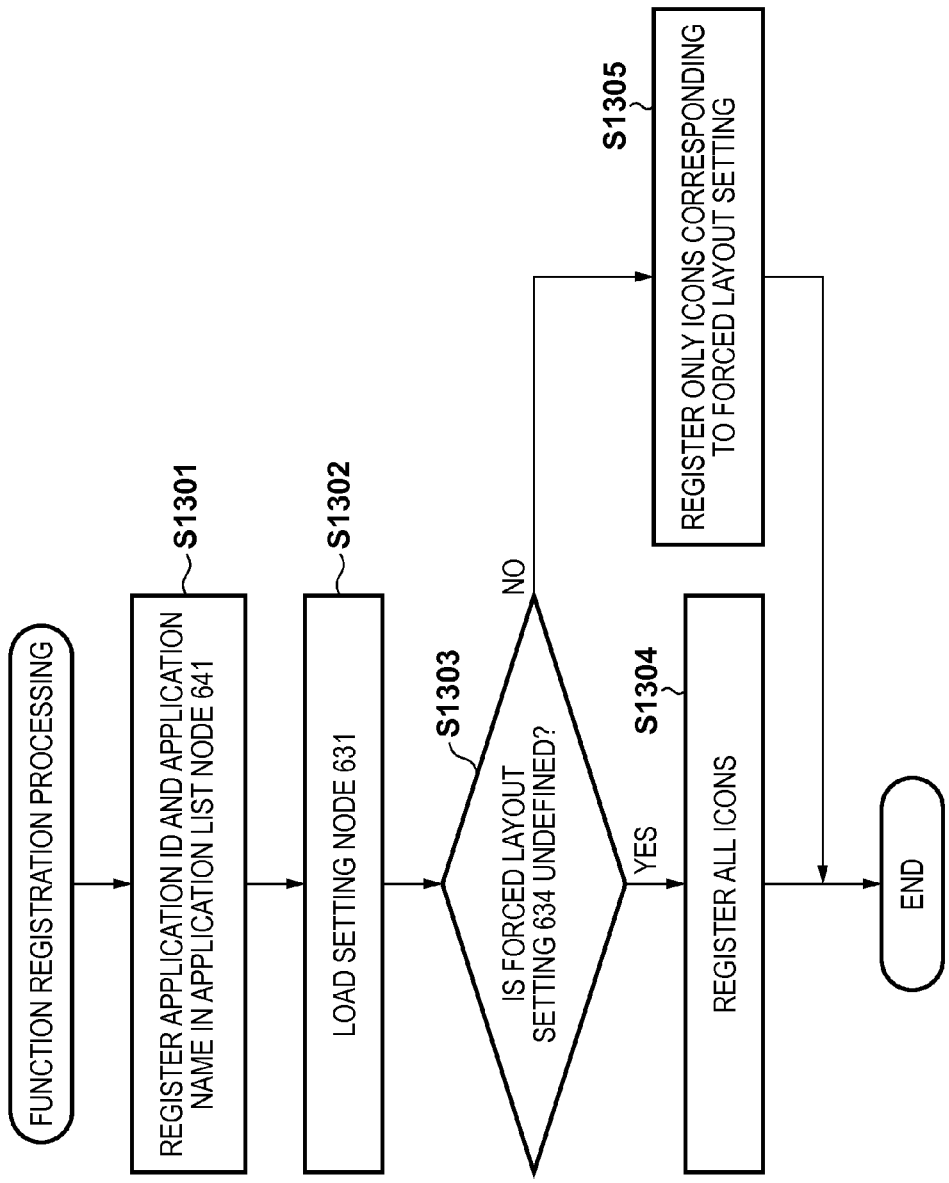
FIG. 13 is a flowchart for explaining registration processing executed by the MFP according to the embodiment.

FIG. 13 is a flowchart for describing the registration processing executed by the custom menu controller 212 of the MFP 101 according to the embodiment. Note that this processing is implemented when the CPU 111 executes the program stored in the ROM 113.

In step S1301, the CPU 111 registers, in the application list node 641 (FIG. 10), the application ID and application name as the information transferred from the function (application) at the time of the registration request. The process advances to step S1302, and the CPU 111 loads the setting node 631 of the non-synchronized setting DB 207 shown in FIG. 10. The process advances to step S1303, and the CPU 111 determines whether or not the forced layout setting 634 is undefined. If it is determined that the forced layout setting 634 is undefined, the process advances to step S1304, and the icon transferred from the function (application) at the time of the registration request is registered in the non-synchronized icon ID node 613 in linkage with the application ID of the function as a calling source, thereby terminating the process.

On the other hand, if it is determined in step S1303 that the forced layout setting 634 is defined, the process advances to step S1305. In step S1305, the CPU 111 registers, in the non-synchronized icon ID nodes 613 (FIG. 10), only icons having a size used in the forced layout setting 634 among the icons transferred from the function, thereby terminating the process. For example, if the forced layout setting 634 designates the three-button layout, no S-size icons are registered. If the nine-button layout is designated, no M-size icons are registered.

Figure 14:
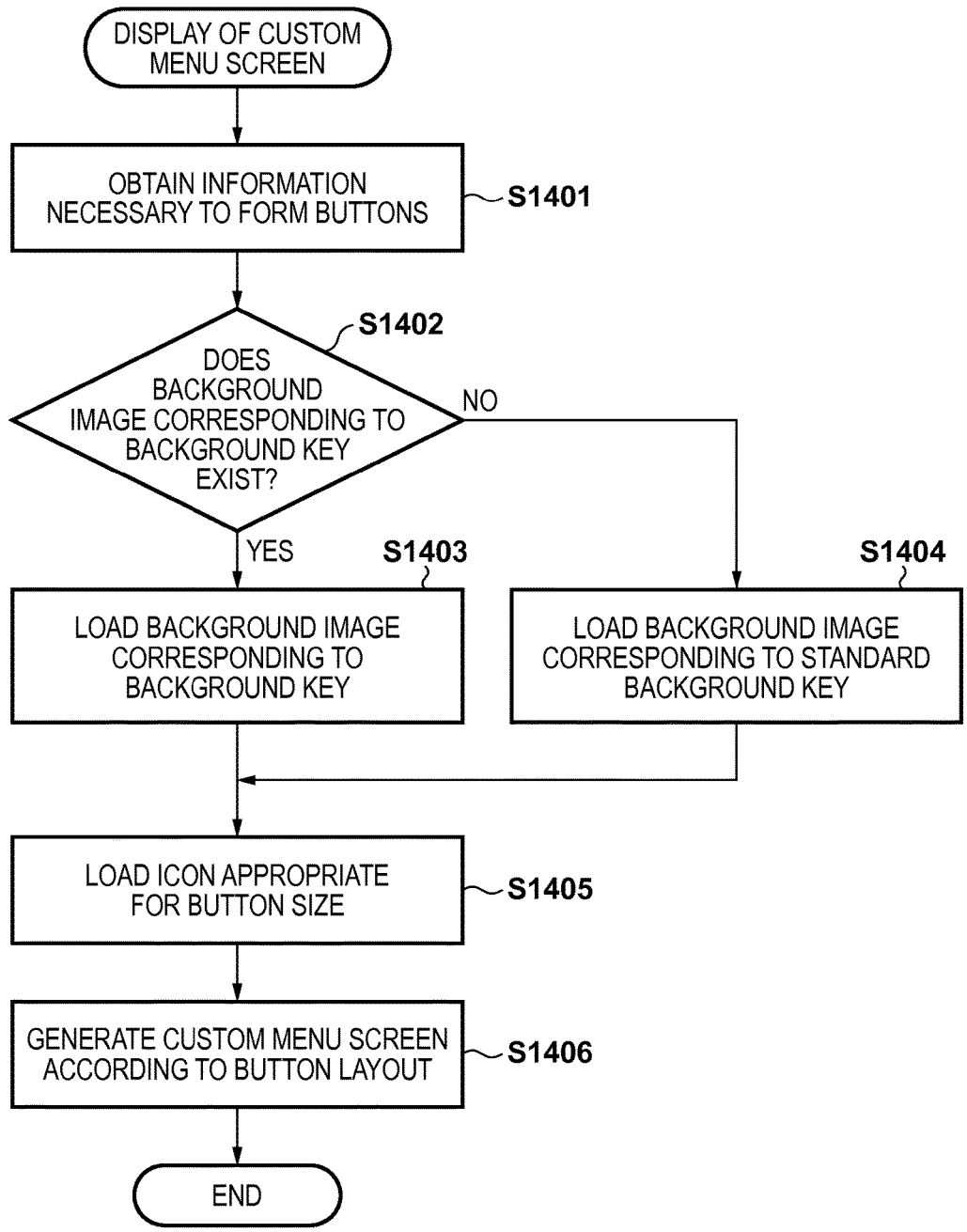
FIG. 14 is a flowchart for describing processing of generating a custom menu screen by the MFP according to the embodiment.

FIG. 14 is a flowchart for describing the generation processing of the custom menu screen by the screen generator 902 of the MFP 101 according to the embodiment. Note that this processing is implemented when the CPU 111 executes the program stored in the ROM 113.

In step S1401, the CPU 111 reads out all the button nodes 652 from the button root nodes 651 (FIG. 11A) in the synchronized setting DB 206. The CPU 111 obtains information (the comment keys 655, button names keys 656, and icon ID keys 657) necessary to form buttons to be arranged on the custom menu screen. At this time, the CPU 111 loads the user setting node 671 from the synchronized setting DB 206 to obtain the user button size 672, thereby determining a button size and layout. The CPU 111 loads the button index node 661 from the synchronized setting DB 206, and determines to arrange a specific button at a specific position.

The process advances to step S1402, and if login processing by the authentication controller 202 has succeeded, the CPU 111 reads out the user background key 673 of the user from the synchronized setting DB 206. On the other hand, if authentication of the user has failed, the CPU 111 obtains the standard background key 633 from the non-synchronized setting DB 207. The CPU 111 refers to a background image corresponding to the obtained background key from the non-synchronized setting DB 207 and synchronized setting DB 206. The CPU 111 determines whether or not the background image corresponding to the background key exists. If it is determined that the background image exists, the process advances to step S1403 to load the background image corresponding to the background key, and then advances to step S1405. On the other hand, if the background image corresponding to the background key does not exist, the process advances to step S1404 to load a background image whose standard background key such as a background image key is "0", and then advances to step S1405.

In step S1405, the CPU 111 searches the non-synchronized setting DB 207 and synchronized setting DB 206 for an icon (M size or S size) appropriate for the button size based on the icon ID key 657 obtained in step S1401 and loads it. Note that synchronization processing by the synchronization controller 205 may fail and thus the icon obtained from the synchronized setting DB 206 is not always normal. If an invalid icon is obtained, the standard icon registered by the registration processing based on the application ID key 654 of the button node 652 is obtained again from the non-synchronized icon ID node 613. The process advances to step S1406, and the CPU 111 arranges buttons, the my button 404, the common button 405, the setting button 440, and the like on the background image, thereby generating a custom menu screen as shown in, for example, FIG. 4A.

Note that the positions of the parts of the menu screen may be prepared as a template file in the XML format or HTML format, and the aspect of the screen may be changed by changing the template file to be loaded depending on the user button size 672 or standard button size 632. In other words, a method of generating a screen at the final stage is not limited as long as information necessary to generate a screen could be acquired.

In this processing, the buttons set as the setting information of the menu screen can be displayed as buttons corresponding to the functions included in the menu screen on the designated background image in the designated layout and size.

Figure 15:
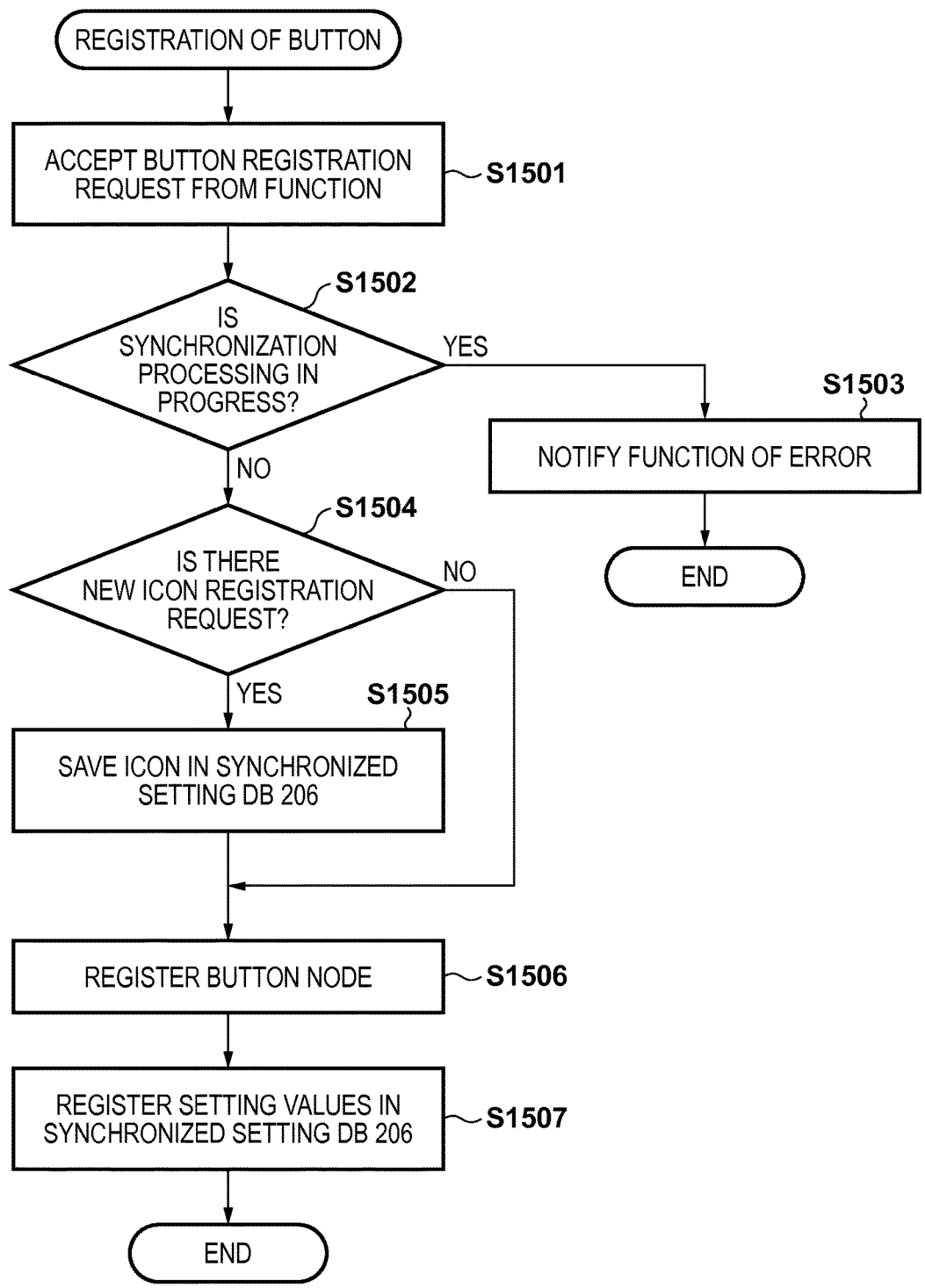
FIG. 15 is a flowchart for describing processing of registering a button in a custom menu by the MFP according to the embodiment.

FIG. 15 is a flowchart for describing processing of registering a button in the custom menu by the button controller 901 of the MFP 101 according to the embodiment. Note that this processing is implemented when the CPU 111 executes the program stored in the ROM 113.

In step S1501, the CPU 111 accepts a button registration request from the function. The process advances to step S1502, and the CPU 111 inquires of the synchronization controller 205 whether synchronization processing is in progress to determine whether or not the synchronization processing is in progress. If it is determined that the synchronization processing is in progress, the process advances to step S1503 to notify the function of an error so as not to reflect an incomplete button in the master setting DB 301, thereby terminating the process.

On the other hand, when the CPU 111 receives a response, indicating that the synchronization processing is not in progress, from the synchronization controller 205 in step S1502, the process advances to step S1504 to determine whether or not a new icon is designated in the button registration request. If it is determined that a new icon is designated, the process advances to step S1505 to add the designated icon as a new synchronized icon ID node 682 to the synchronized setting DB 206, and then advances to step S1506. On the other hand, if it is determined in step S1504 that no new icon is designated, the process advances to step S1506 without performing processing of newly registering an icon.

In step S1506, the CPU 111 sets a value in each element of the button node 652 to update the button node 652. Note that in response to the button registration request, the CPU 111 generates unique identification information, and sets it in the action ID key 653. The application ID 612 is designated from the function which has requested to register the button. Note that the CPU 111 determines whether or not the button registration request is a request from a function which has been registered in the application list node 641 of the non-synchronized setting DB 207. If the button registration request is not from the registered function, it is discarded. Values designated from the function are set in the comment key 655, button name key 656, and icon ID key 657. The process advances to step S1507, and the CPU 111 registers the setting information of the function in the synchronized setting DB 206 so as to refer to it in linkage with the action ID key 653, thereby terminating the process.

In this processing, in response to the registration request of the button on the menu screen from the function, it is possible to register, in the synchronized setting DB 206, the ID of an icon and a name to be displayed on the button.

Figure 16:
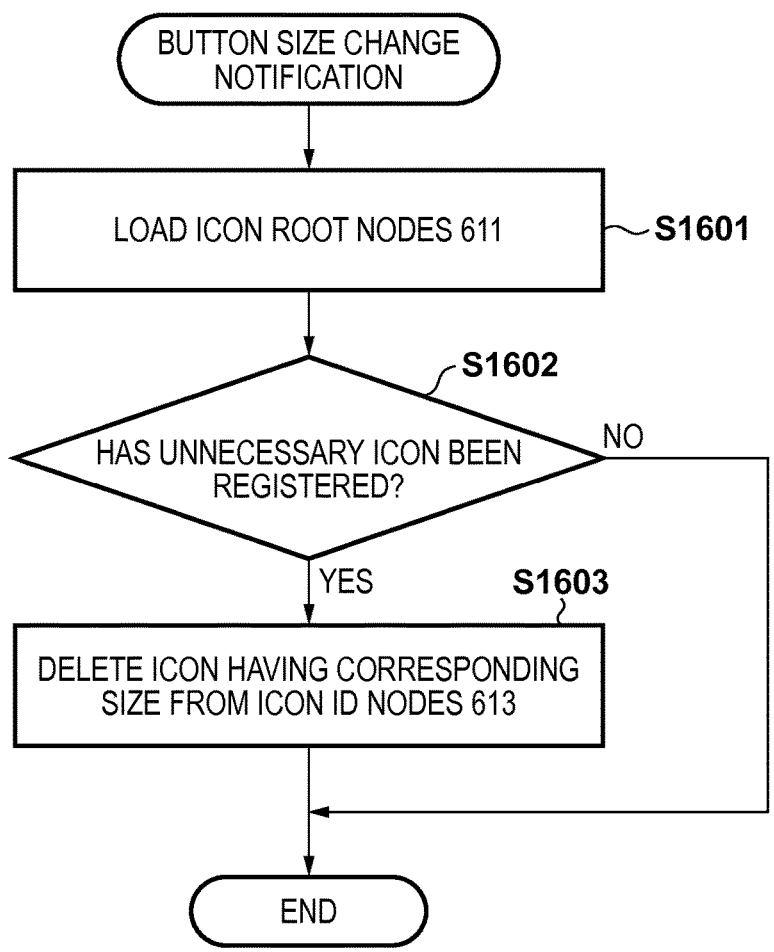
FIG. 16 is a flowchart for describing processing in which the MFP deletes an unnecessary icon along with a change in a forced layout setting according to the embodiment.

FIG. 16 is a flowchart for describing processing in which the custom menu controller 212 of the MFP 101 deletes an unnecessary icon along with a change in the forced layout setting 634 according to the embodiment. Note that this processing is implemented when the CPU 111 executes the program stored in the ROM 113.

In step S1601, the CPU 111 loads the synchronized icon root nodes 681 from the synchronized setting DB 206, and the icon root nodes 611 from the non-synchronized setting DB 207. The process advances to step S1602, and the CPU 111 refers to all the icon ID nodes (synchronized icon ID nodes 682 and non-synchronized icon ID nodes 613) from the nodes loaded in step S1601. The CPU 111 determines whether or not an icon which has become unnecessary according to the forced layout setting 634 has been registered. If the CPU 111 determines that the unnecessary icon has been registered, the process advances from step S1602 to step S1603 to delete an icon having a corresponding size from the non-synchronized icon ID nodes 613, thereby terminating the process. If the CPU 111 determines in step S1602 that no unnecessary icon has been registered, the process ends without performing icon deletion processing.

Figure 17:
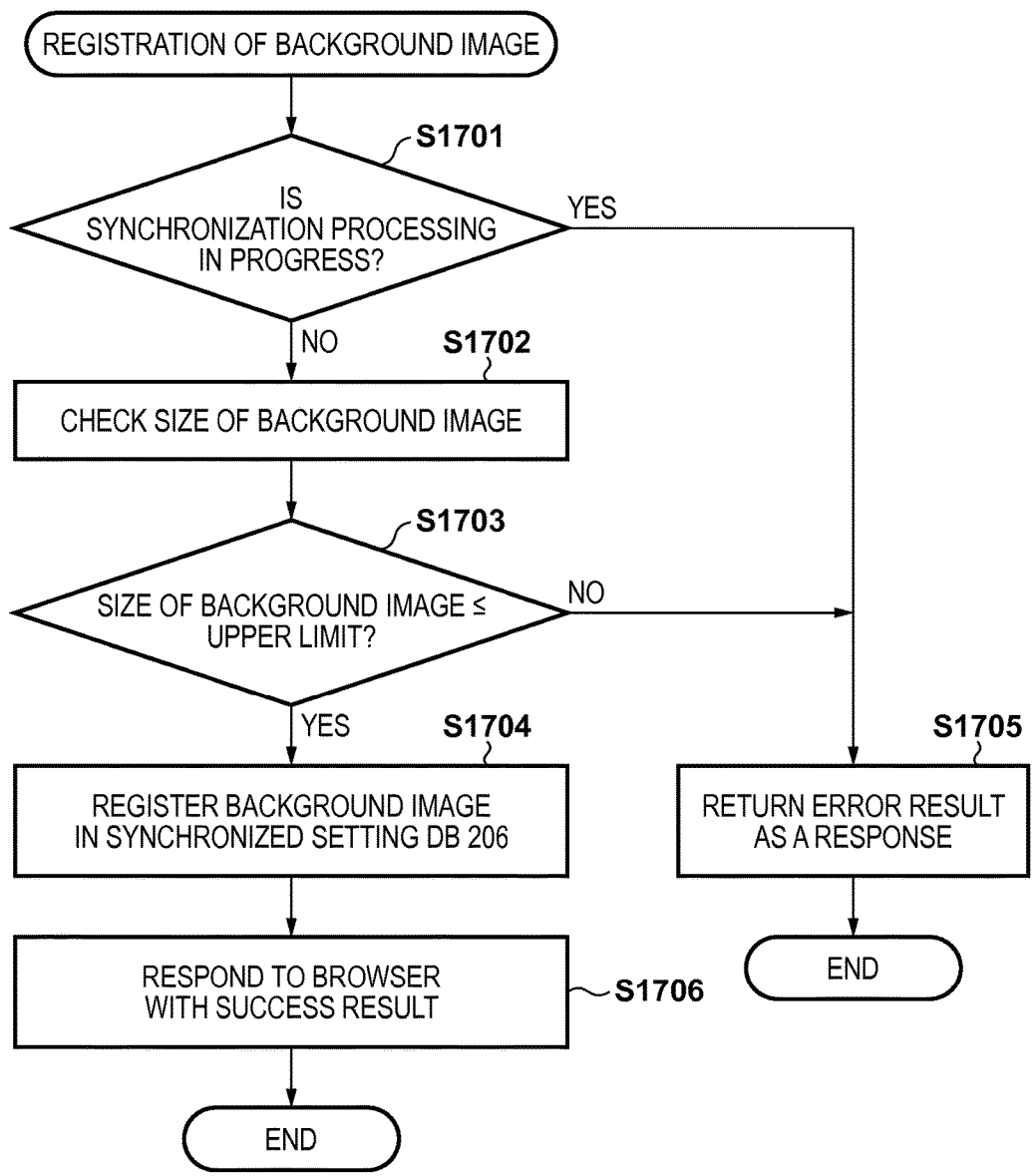
FIG. 17 is a flowchart for describing processing when the MFP accepts a background image registration request according to the embodiment.

FIG. 17 is a flowchart for describing processing when the background controller 903 of the MFP 101 accepts a background image registration request according to the embodiment. Note that this processing is implemented when the CPU 111 executes the program stored in the ROM 113.

In step S1701, the CPU 111 inquires of the synchronization controller 205 whether or not synchronization processing is in progress. If the synchronization processing is in progress, the process advances to step S1705 to return an error notification response to the registration request source via the network 102, thereby terminating the process. This is done not to reflect an incomplete background image in the master setting DB 301.

On the other hand, if it is determined in step S1701 that the synchronization processing is not in progress, the process advances to step S1702, and the CPU 111 calculates the file size of a background image for which a registration request has been issued. The process advances to step S1703, and the CPU 111 determines whether or not the size of the background image exceeds an upper limit value. If it is determined that the size exceeds the upper limit value, the process advances to step S1705 to return an error notification response to the registration request source via the network 102, thereby terminating the process.

On the other hand, if it is determined in step S1703 that the size of the background image does not exceed the upper limit value, the process advances to step S1704 and the CPU 111 generates the background image key 692 corresponding to the background image in the synchronized setting DB 206, and registers it in the synchronized background image node 691. The process advances to step S1706 and the CPU 111 responds to the Web browser with a success result, thereby terminating the process.

Synchronization processing executed between the MFP 101 and the setting server 300 according to this embodiment will be explained.

FIG. 18 is a sequence chart for explaining setting value synchronization processing executed between the MFP 101 and the setting server 300 in the information processing system according to the embodiment. Note that processing executed by the MFP 101 in this sequence chart is implemented when the CPU 111 of the MFP 101 executes the program stored in the ROM 113, and controls the respective components via the system bus 110 and the respective I/Fs.

In step S1801, the CPU 111 authenticates the user of the MFP 101. More specifically, when the user inputs a user ID and password via the touch panel 118, the CPU 111 collates the input user ID and password with user IDs and passwords saved in advance in the MFP 101. If there are a matched user ID and password, it is determined that the user is allowed to use the MFP 101. When authentication of the user succeeds, the CPU 111 transmits, in step S1802, to the setting server 300, a user ID indicating the user ID of the authenticated user and latest updated date information indicating the date/time when the setting information is obtained last from the setting server 300. The setting server 300 receives the user ID and latest updated date information from the MFP 101. In step S1803, the setting server 300 obtains the setting information of the user based on the user ID and latest updated date information which have been transmitted from the MFP 101. Furthermore, the setting server 300 specifies user setting information updated at a timing later than the date/time indicated by the latest updated date information. In step S1804, the setting server 300 transmits the specified user setting information to the MFP 101. Then, the MFP 101 receives the setting information from the setting server 300, and stores it in the synchronized setting DB 206. In step S1805, the CPU 111 reflects the setting information of the user obtained from the setting server 300 in the MFP 101.

After that, the user executes an arbitrary user operation. As an example, the user changes a specific setting value in step S1806. In this case, when the setting information stored in the synchronized setting DB 206 is changed, the MFP 101 transmits the setting information of the user stored in the synchronized setting DB 206 to the setting server 300 and saves it at a predetermined timing after the user operation is executed. In this embodiment, assume that save processing in the setting server 300 is performed upon accepting a logout instruction as the predetermined timing. Note that this timing is not limited to the logout timing. For example, the timing may be a timing at which execution of a copy job or print job is instructed, or a timing at which a job normally ends. Alternatively, the timing may be a timing at which the user explicitly instructs to save data in the setting server 300.

More specifically, upon accepting a logout instruction, the CPU 111 obtains, in step S1807, the setting information which corresponds to the user ID of the login user and is stored in the synchronized setting DB 206. In step S1808, the CPU 111 transmits, to the setting server 300, the user ID and the setting information which corresponds to the user ID and has been obtained in step S1807, and executes user logout processing. Then, the setting server 300 receives the user setting information transmitted from the MFP 101, and saves, in step S1809, the received user setting information in itself. In step S1810, the setting server 300 transmits, to the MFP 101, completion information indicating that the save processing is complete, and the MFP 101 receives the save completion information from the setting server 300.

When the user logs in to the MFP 1102, the MFP 1102 transmits, to the setting server 300, a user ID indicating the user ID of the user authenticated by the MFP 1102 and latest updated date information indicating the date/time when the setting information is obtained last from the setting server 300. Then, the setting server 300 obtains the setting information of the user based on the user ID and latest updated date information transmitted from the MFP 1102, and transmits the obtained setting information of the user to the MFP 1102. The user of the MFP 1102 can display the same custom menu screen by using the same setting information as that set in the MFP 101.

As described above, according to the embodiment, it is possible to synchronize icons indicating the features of buttons of an image forming apparatus with those of another image forming apparatus. This allows the user to perform a similar operation on the same screen regardless of the image forming apparatus.

By registering standard icons held by the image forming apparatus in an area which is not a synchronization target, it is possible to add shortcut buttons for calling functions without unnecessarily increasing icons.

On the other hand, by registering icons other than the standard icons held by the image forming apparatus in an area which is a synchronization target, it is possible to display appropriate icons as shortcut buttons even in an environment in which a plurality of image forming apparatuses are installed. This can limit icons as synchronization targets to those necessary for an image forming apparatus, and thus it is possible to avoid the storage area of the image forming apparatus from being unnecessarily cluttered and handle more buttons. Alternatively, since it becomes possible to add many applications, the user convenience improves.

In the embodiment, standard background images held by the image forming apparatus are registered in an area which is not a synchronization target, and additionally registered background images are registered in an area which is a synchronization target. With this processing, when the synchronization processing of the background images of image forming apparatuses is performed, the held standard background images are not synchronization targets, and only the added background images are synchronization targets. Therefore, even if there exist image forming apparatuses which have different standard background images, only added background images undergo synchronization processing without changing the background images originally existing in each image forming apparatus, thereby avoiding an unnecessary increase in the load of the network.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-181598, filed Sep. 5, 2014, which is hereby incorporated by reference herein in its entirety.

What is claimed is:

1. An information processing system including a server and a plurality of information processing apparatuses,
wherein the server comprises:
a storage unit configured to store setting information of menu screens of the plurality of information processing apparatuses, and
wherein each of the plurality of information processing apparatuses comprises:
a registration unit configured to register the setting information of a menu screen displayed on the information processing apparatus,
a first storage unit configured to store first setting information as a non-synchronization target, which has been registered by the registration unit,
a second storage unit configured to store second setting information as a synchronization target, which has been registered by the registration unit,
a transmission unit configured to transmit, to the server, difference information between the second setting information stored by the second storage unit and the setting information stored by the storage unit, and
a synchronization control unit configured to perform synchronization of the second setting information between the server and the second storage unit.

2. The system according to claim 1, wherein the setting information of the menu screen includes at least an application registered in the menu screen, identification information of a background image, a size of an icon of the application, and a name to be displayed on the icon.

3. The system according to claim 1, wherein the first setting information includes an application registered in the menu screen, identification information of a standard background image of the menu screen, and a size of an icon of the application.

4. The system according to claim 1, wherein the second setting information includes an application registered in the menu screen, identification information of a background image of the menu screen, a size of an icon of the application, a name to be displayed on the icon, a size of the icon corresponding to a user, and information for specifying a background image.

5. The system according to claim 1,
wherein each of the plurality of information processing apparatuses further comprises a setting unit configured to set a layout of the menu screen, and
wherein when the setting unit sets the layout of the menu screen, the registration unit registers only setting information corresponding to the set layout.

6. The system according to claim 5, wherein when the setting unit sets the layout of the menu screen, the registration unit deletes setting information which does not correspond to the set layout.

7. The system according to claim 4, wherein the second setting information includes information for specifying a background image set by the user.

8. An information processing apparatus for communicating with a server, comprising:
a display unit configured to display a menu screen;
a registration unit configured to register setting information of the menu screen;
a first storage unit configured to store first setting information as a non-synchronization target, which has been registered by the registration unit;
a second storage unit configured to store second setting information as a synchronization target, which has been registered by the registration unit;

a transmission unit configured to transmit, to the server, difference information between the second setting information stored in the second storage unit and setting information stored in the server; and a synchronization control unit configured to perform synchronization of the second setting information between the server and the second storage unit.

9. The apparatus according to claim 8, wherein the setting information of the menu screen includes at least an application registered in the menu screen, identification information of a background image, a size of an icon of the application, and a name to be displayed on the icon.

10. The apparatus according to claim 8, wherein the first setting information includes an application registered in the menu screen, identification information of a standard background image of the menu screen, and a size of an icon of the application.

11. The apparatus according to claim 8, wherein the second setting information includes an application registered in the menu screen, identification information of a background image of the menu screen, a size of an icon of the application, a name to be displayed on the icon, a size of the icon corresponding to a user, and information for specifying a background image.

12. A method of controlling an information processing apparatus for communicating with a server, comprising:
   displaying a menu screen;
   registering setting information of the menu screen;
   storing first setting information as a non-synchronization target, which has been registered in the registering;
   storing second setting information as a synchronization target, which has been registered in the registering;
   transmitting, to the server, difference information between the stored second setting information and setting information stored in the server; and
   performing synchronization of the second setting information between the server and the stored second setting information.

13. A non-transitory computer-readable storage medium storing a program for causing a computer to function as an information processing apparatus for communicating with a server, comprising:
   a display unit configured to display a menu screen;
   a registration unit configured to register setting information of the menu screen;
   a first storage unit configured to store first setting information, which has been registered by the registration unit;
   a second storage unit configured to store second setting information as a synchronization target, which has been registered by the registration unit;
   a transmission unit configured to transmit, to the server, difference information between the second setting information stored by the second storage unit and setting information stored in the server; and
   a synchronization control unit configured to perform synchronization of the second setting information between the server and the second storage unit.

14. An information processing apparatus for communicating with a server, comprising:
   a memory device that stores a set of instructions; and
   at least one processor that executes the instructions of:
      displaying a menu screen on a display;
      registering, as one or more icons to be displayed on the menu screen, a first type of icon and, registering, as one or more icons to be displayed on the menu screen, a second type of icon as a synchronization target; and
      synchronizing an icon being the synchronization target with the server by transmitting the second type of icon to the server.

15. The information processing apparatus according to claim 14, wherein
   the first type of icon is a common icon which has been registered, in common, in a plurality of information processing apparatuses which communicate with the server; and
   the second type of icon is an icon which is registered in the information processing apparatus through a web browser.

16. The information processing apparatus according to claim 14, wherein the second icon is synchronized with another information processing apparatus via the server, and the first icon is not synchronized with the another information processing apparatus via the server.

17. A method of controlling an information processing apparatus for communicating with a server, comprising:
   displaying a menu screen on a display;
   registering, as one or more icons to be displayed on the menu screen, a first type of icon and, registering, as one or more icons to be displayed on the menu screen, a second type of icon as a synchronization target; and
   synchronizing an icon being the synchronization target with the server by transmitting the second type of icon to the server.

18. A non-transitory computer-readable storage medium storing a program for causing a computer to function as an information processing apparatus for communicating with a server, the information processing apparatus comprising:
   a memory device that stores a set of instructions; and
   at least one processor that executes the instructions of:
      displaying a menu screen on a display;
      registering, as one or more icons to be displayed on the menu screen, a first type of icon and, registering, as one or more icons to be displayed on the menu screen, a second type of icon as a synchronization target; and
      synchronizing an icon being the synchronization target with the server by transmitting the second type of icon to the server.

* * * * *